US008452054B2

(12) United States Patent
Kuoch et al.

(10) Patent No.: US 8,452,054 B2
(45) Date of Patent: *May 28, 2013

(54) OBSTACLE DETECTION PROCEDURE FOR MOTOR VEHICLE

(75) Inventors: Siav Kuong Kuoch, Vincennes (FR); Lowik Chanussot, Paris (FR); Julien Rebut, Paris (FR); Adrien Charpentier, Stuttgart (DE); Eric Dubois, Rosny Sous Bois (FR); Fleury Benoist, Vincennes (FR); Patrice Reilhac, Esslingen (DE)

(73) Assignee: Valeo Vision, Bobigny (FR)

( * ) Notice: Subject to any disclaimer, the term of this patent is extended or adjusted under 35 U.S.C. 154(b) by 359 days.

This patent is subject to a terminal disclaimer.

(21) Appl. No.: 12/829,594

(22) Filed: Jul. 2, 2010

(65) Prior Publication Data

US 2011/0002507 A1 Jan. 6, 2011

(30) Foreign Application Priority Data

Jul. 6, 2009 (FR) ...................................... 09 54632

(51) Int. Cl.
*G06K 9/00* (2006.01)

(52) U.S. Cl.
USPC ........................................... 382/104; 340/436

(58) Field of Classification Search
None
See application file for complete search history.

(56) References Cited

U.S. PATENT DOCUMENTS

2009/0268946 A1* 10/2009 Zhang et al. ................... 382/104

OTHER PUBLICATIONS

Philip Kelly, B.A., "Pedestrian Detection and TrackingUsing Stereo Vision Techniques", Dec. 2007, Dublin City University.*

Benhimane et al.; Real-time image-based tracking of planes using efficient second-order minimization:, IEEE/RSJ International Conference on Intelligent Robots Systems, Sendai, Japan. 2004.
Christogiannopoulos et al.; "Segmentation of Moving Objects from Cluttered Background Scenes Using a Running Average Model". SPIE Journal, vol. 5822, pp. 13-20. 2005.
Cortes et al.; "SVM Method (Support-Vector Machine)"—published by Kluwer Academic Publishers, Boston and written by Corinna Cortes and Vladimir Vapnik. 1995.
Gandhi T et al.; "Pedestrian Protection Systems: Issues, Survey, and Challenges". IEEE Transactions on Intelligent Transportation Systems, IEEE Service Center, Piscataway, NJ, US LNKD-DOI:10. 1109/TITS.2007.903444, vol. 8, No. 3, pp. 413-430. Sep. 1, 2007.
Geronimo et al.; "Pedestrial detection using Adaboost learning of features and vehicle pitch estimation", Proc. of the Sixth IASTED International Conference on Vizualizatio, Imaging and Image Processing, pp. 400-405. Aug. 28-30, 2006.
Junfeng et al.; "Real-Time Pedestrian Detection and Tracking at Nighttime for Driver-Assistance Systems", IEEE Transactions on Intelligent Transportation Systems, IEEE Service Center, Piscataway, NJ, US, vol. 10, No. 2, pp. 283-298. Jun. 1, 2009.

(Continued)

*Primary Examiner* — Andrew W Johns
*Assistant Examiner* — Siamak Harandi
(74) *Attorney, Agent, or Firm* — Jacox, Meckstroth & Jenkins

(57) ABSTRACT

An obstacle detection procedure within the area surrounding a motor vehicle comprising the following stages: carrying out a first obstacle detection by image processing resulting in a definition of at least one region of interest, classifying the detected obstacle with an index of confidence applied to the region of interest in relation to given characteristics, carrying out a second obstacle detection by sensor/s with detection range below a first threshold resulting in a determined position, projecting the determined position into a reference marker, projecting the region of interest into this reference marker and aligning the two projections obtained and attributing a determined position to the obstacle classified in accordance with the alignment.

37 Claims, 24 Drawing Sheets

OTHER PUBLICATIONS

Massimo et al.; "Artificial Vision in Road Vehicles", Proceedings of the IEEE, IEEE. New York, US., vol. 90, No. 7. Jul. 1, 2002.

Meir et al.; "An Introduction to Boosting and Leveraging", Department of Electrical Engineering, Technion, Haifa 32000 Israel / Research School of Information Science & Engineering—the Australian National University, Canberra, ACT 0200, Australia. 2003.

Premebida et al.; "A Lidar and Vision-Based Approach for Pedestrian and Vehicle Detection and Tracking", Intelligent Transportation Systems, Conference, 2007. ITSC 2007. IEEE, IEEE, PI, pp. 1044-1049. Sep. 1, 2007.

Schweiger et al.; "Multiple-Cue Data Fusion with Particle Filters for Vehicle Detection in Night View Automotive Applications", Intelligent Vehicles Symposium. Proceedings. IEEE Las Vegas, NV, USA. 2005.

Spinello et al.; "Human Detection Using Multimodal and Multidimensional Features", 2008 IEEE International Conference on Robotics and Automation. The Half-Day Workshop On: Towards Autonomous Agriculture of Tomorrow, IEEE—Piscataway, NJ, USA, pp. 3264-3269. May 19, 2008.

Toya et al.; "Pedestrian Recognition Using Stereo Vision and Historgram of Oriented Gradients". Vehicular Electronics and Safety, 2008. ICVES 2008. IEEE Inernational Conference on, IEEE, Piscataway, NJ, USA, pp. 57-62. Sep. 22, 2008.

Zhenjiang et al.; "A Review on Vision-Based Pedestrian Detection for Intelligent Vehicles". Vehicluar Electronics and Safety, 2006, ICVES 2006. IEEE International Conference on, IEEE, PI, pp. 57-62. Dec. 1, 2006.

* cited by examiner

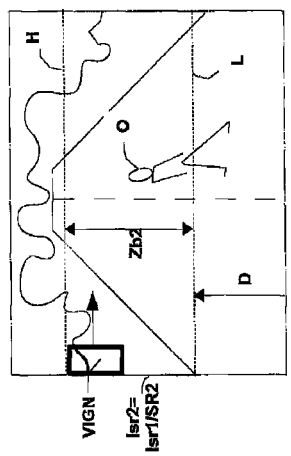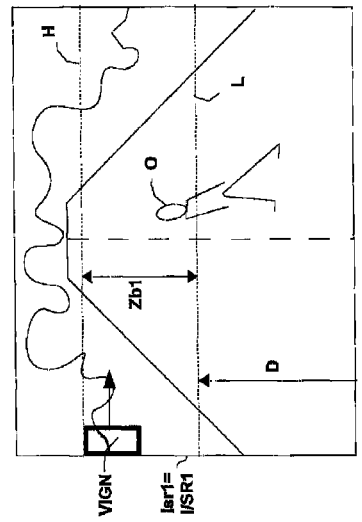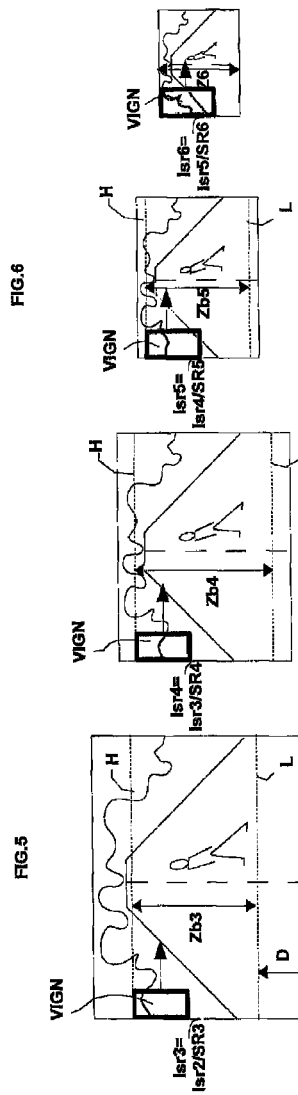

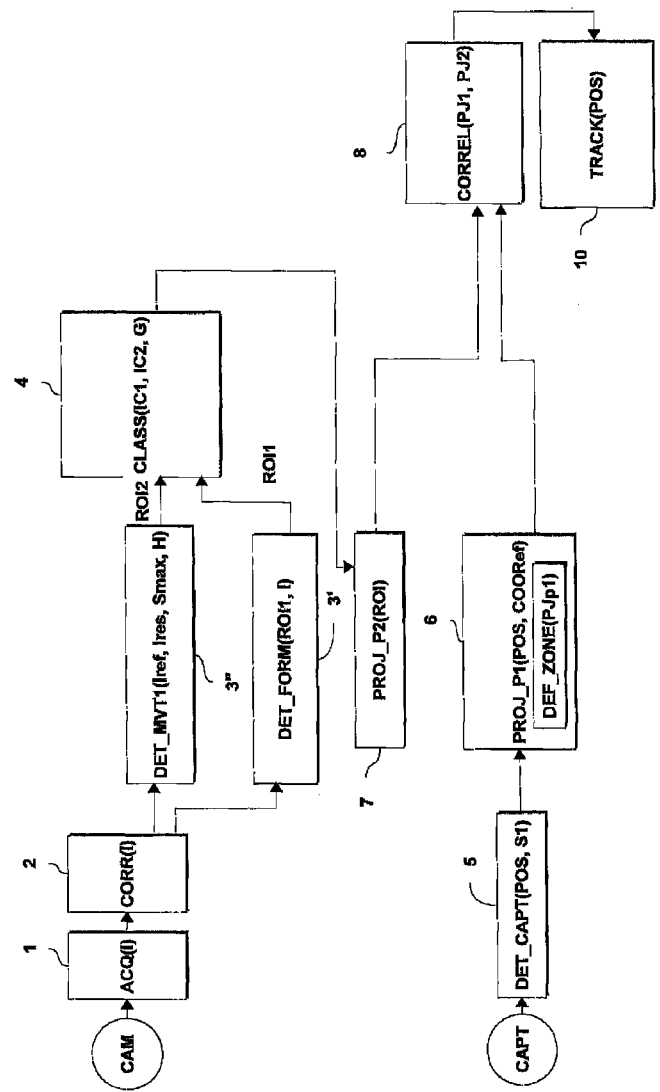

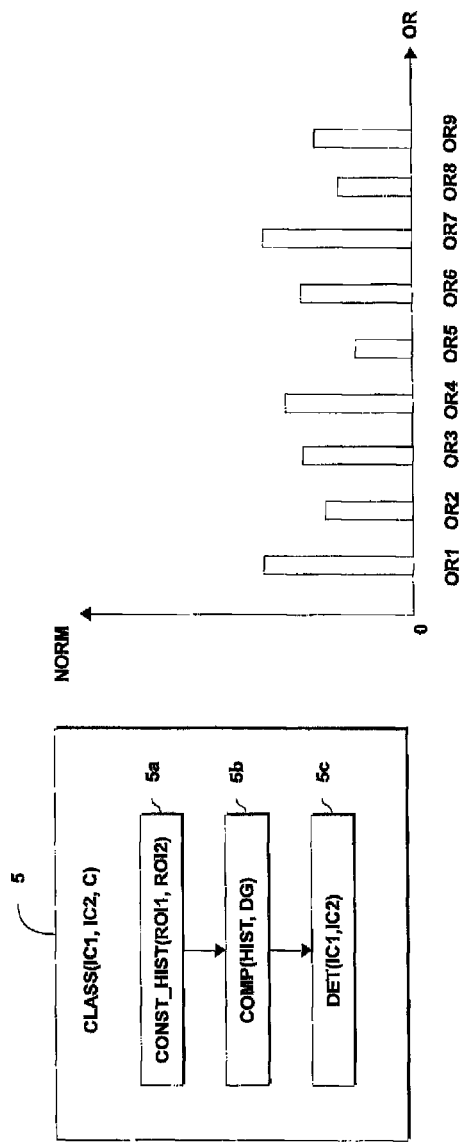

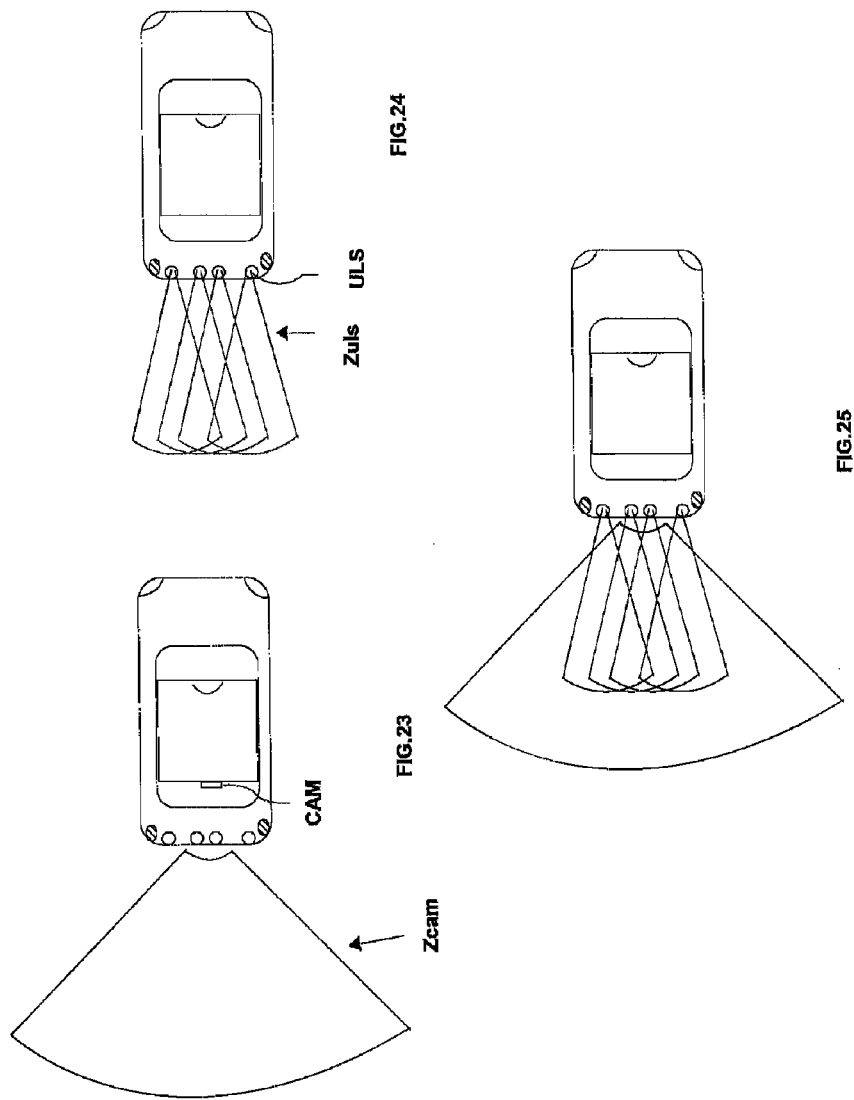

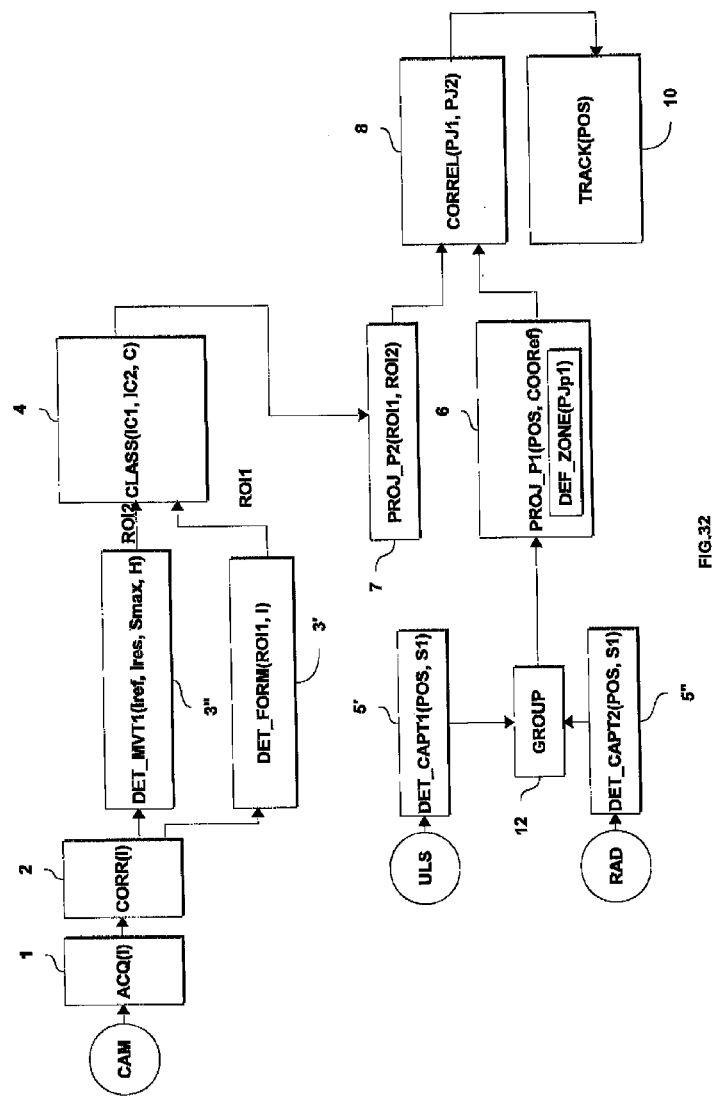

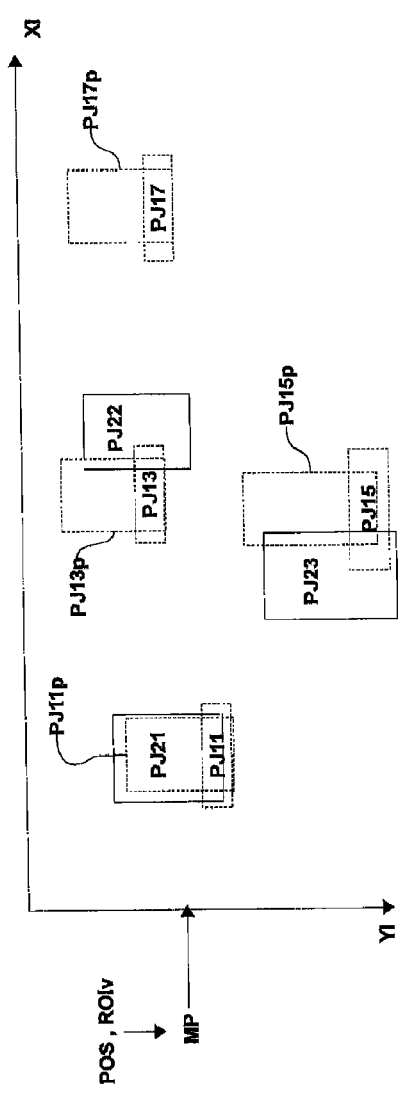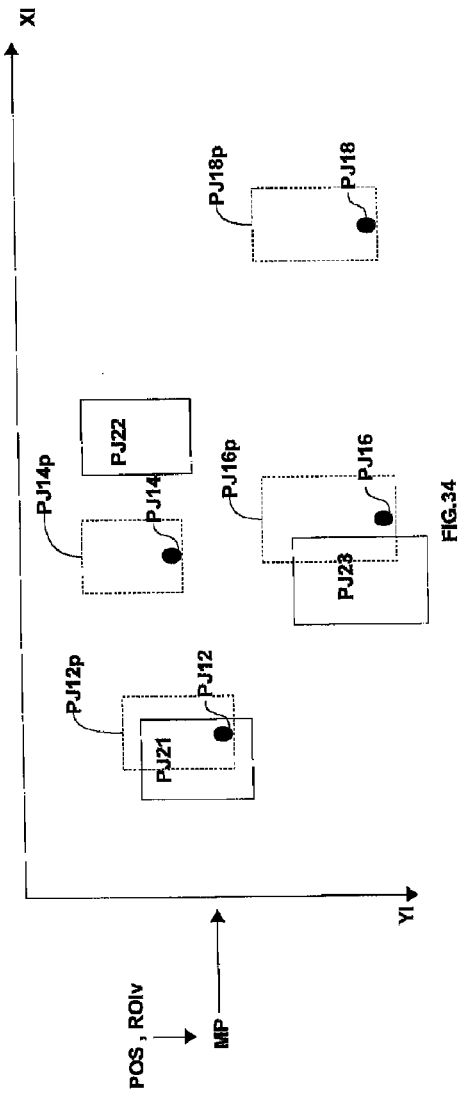

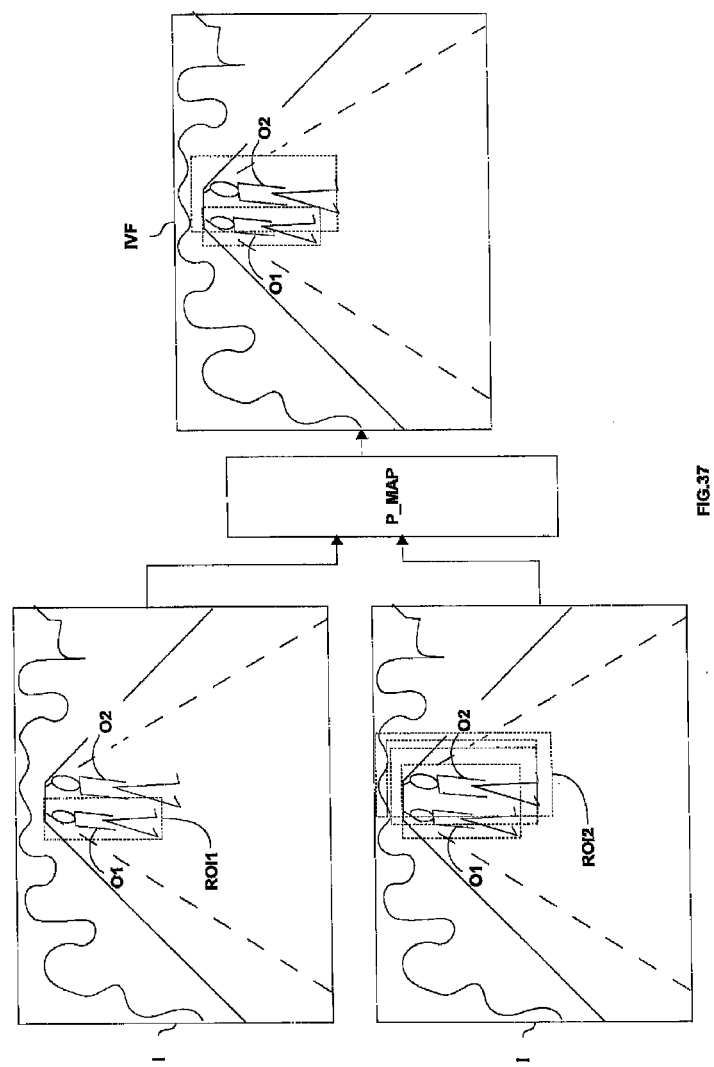

OBSTACLE DETECTION PROCEDURE FOR MOTOR VEHICLE

CROSS-REFERENCE TO RELATED APPLICATIONS

This application claims priority to French Application No. 0954632 filed Jul. 6, 2009, which application is incorporated herein by reference and made a part hereof.

BACKGROUND OF THE INVENTION

1. Field of the Invention

The present invention concerns an obstacle detection procedure within the area surrounding a motor vehicle.

It also concerns a commissioning device of the procedure.

2. Description of the Related Art

This invention particularly applies in the field of motor vehicles.

In the field of motor vehicles, a known state of the technique of an obstacle detection procedure within the area surrounding a motor vehicle, involves the following stages:

detection of a pedestrian by means of a camera; and dispatch of an alarm signal to warn the driver of the presence of a pedestrian.

One disadvantage of this state of the technique is that the position determined by the camera is not accurate.

There is, therefore, a need to provide an improved obstacle detection procedure system.

SUMMARY OF THE INVENTION

The present invention aims to provide an obstacle detection procedure within the area surrounding a motor vehicle, which makes it possible to precisely detect the position of a pedestrian.

According to a first object of the invention, this aim is achieved by an obstacle detection procedure within the area surrounding a motor vehicle, featuring the fact that it involves the following stages:

to carry out a first obstacle detection by image processing resulting in a definition of at least one region of interest;

to classify the detected obstacle with an index of confidence applied to the region of interest in relation to given characteristics;

to carry out a second obstacle detection by sensor(s) with detection range below a first threshold resulting in a determined position;

to project the determined position into a reference marker;

to project the region of interest into this reference marker; and to align the two projections obtained and attribute a determined position to the obstacle classified in accordance with the alignment.

As one will see in detail hereinafter, the fact of combining detection by image processing and detection by sensor(s) will make it possible to classify an obstacle, and the alignment of these two detections will make it possible to position this classified obstacle (as a pedestrian) more accurately.

According to modes of completion without limitations, the detection procedure may involve, moreover, one or more further characteristics among the following:

the reference marker is the image marker. This makes it possible to minimize the impact of distance estimation errors of the regions of interest in the vehicle marker.

the first detection by image processing involves detection by shape recognition in an acquired image of this environment.

detection by shape recognition involves the following sub-stages:

constructing a pyramid of images by recursive sub-sampling of an acquired image;

for each sub-sampled image:

scanning this image with a label representing a certain obstacle; and at each successive position of a label in this image, analyzing its content by means of a set of classifiers, these classifiers being determined during a phase of prior apprenticeship.

This makes it possible to detect obstacles according to the detection distances at which they are situated in an image. The result of the application classifiers makes it possible to determine if an obstacle is situated in a label and thus detect it. The term label signifies, in the present application, a detection zone in the image. This detection zone is of a certain size and of shape. Of course, it is possible to give it different shapes. The system according to the present invention arranges obstacle detection within the limits of this label. According to one variant of completion, the label represents the obstacle to be detected in that it corresponds approximately to the surface that this type of obstacle will occupy in the image. For example, in order to detect a pedestrian, one may take a rectangular shape the large side of which is vertical. Thus, any pedestrian whose image is within this rectangle will be detected.

Detection by shape recognition also involves a further sub-stage to determine a scanning zone in a sub-sampled image. This reduces the number of processing operations.

The first detection by image processing involves movement detection in relation to the vehicle on a sequence of acquired images of this environment.

Movement detection involves the following sub-stages:

constructing a background image recalculated for each image of a sequence of images;

taking out the background image to the current image in the sequence of images resulting in a resulting image;

discriminating certain movements in the resulting image according to a threshold; and extracting second regions of interest from the discrimination.

This makes it possible to obtain the obstacles in movements that do not belong to the background.

The classification stage involves the following sub-stages:

creating a vector of characteristics from the regions of interest;

classifying this vector of characteristics by comparison with a border of decision determined previously during an apprenticeship stage; and determining an associated index of confidence according to the distance of the vector of characteristics in relation to this border of decision.

This makes it possible to associate with the classified region of interest an index of confidence representing the certainty of belonging to a class.

The vector of characteristics is a histogram of the orientated gradients of a region of interest.

The use of histograms is simple and quick to commission.

The detection procedure also involves a further stage of validating the classification of the object detected in relation to regions of interest and in relation to indices of confidence determined during the first detection and/or during the classification.

The validation stage involves the following sub-stages:
constructing a probability card corresponding to an image in which each classified region of interest is represented by a distribution of probability;
accumulating these distributions of probability which tally in the probability card in order to obtain a local maximum; and
validating the region of interest which is closer to each local maximum of the probability card.

The use of a probability card is simple and quick to commission.

This makes it possible to accumulate the probabilities on regions likely to represent a pedestrian.

Detection by sensor(s) is carried out by means of ultrasound sensors. This gives a cover of detection close to the vehicle.

Detection by sensor(s) is carried out by means of radar sensors. This gives a cover of detection further from the vehicle.

The detection procedure also involves a further stage of applying a change of perspective to an acquired image. This makes it possible to reduce distortions in the acquired image, particularly on obstacles situated at the border of an image.

The detection procedure also involves a further stage of follow-up of the regions of interest classified on a sequence of acquired images. This makes it possible to confirm the presence of a so-called validated region of interest and smooth its position over a whole sequence of images.

According to a second object of the invention, this concerns a detection device of an obstacle within the area surrounding a motor vehicle, featuring the fact that it is fit to:
carry out a first obstacle detection by image processing resulting in a definition of at least one region of interest;
classify the detected obstacle with an index of confidence applied to the region of interest in relation to given characteristics;
carry out a second obstacle detection by sensor(s) with detection range below a first threshold resulting in a determined position;
project the determined position into a reference marker;
project the region of interest in this reference marker; and
align the two projections obtained and attribute a certain position to the obstacle classified in accordance with the alignment.

According to a third object of the invention, this concerns a computer program product including one or more sequences of instructions executable from an information processing unit, the execution of these sequences of instructions allowing the procedure to be commissioned according to any one of the previous characteristics.

The invention and its different applications will be better understood by reading the following description and examining the figures which accompany it.

These are only presented by way of indication and in no way limit the invention.

These and other objects and advantages of the invention will be apparent from the following description, the accompanying drawings and the appended claims.

BRIEF DESCRIPTION OF THE ACCOMPANYING DRAWINGS

FIGS. 5 to 11 illustrate in diagram form certain images used by a stage of detection by image processing according to the first mode of completion of FIG. 4;

FIG. 17 is an organization chart of the detection procedure of FIG. 1 which illustrates a stage of detection by image processing combining the first mode of completion of FIG. 4 and the second mode of completion of FIG. 13;

FIG. 18 is an organization chart of the detection procedure of FIG. 1 which illustrates an obstacle classification stage according to a mode of completion without limitation;

FIG. 19 represents in diagram form a histogram of orientated gradients used by the classification stage of obstacles of FIG. 18;

FIG. 23 illustrates in diagram form a vehicle including an image acquisition device used by the detection procedure of FIG. 1 and a detection zone of this acquisition device;

FIG. 24 illustrates in diagram form a vehicle including an ultrasound sensor-operated detection device according to the first mode of completion without limitation of FIG. 22 and a detection zone of this detection device;

FIG. 25 illustrates in diagram form a vehicle including an image acquisition device of FIG. 23 and an ultrasound sensor-operated detection device of FIG. 24 as well as their respective detection zone;

Figure 1:
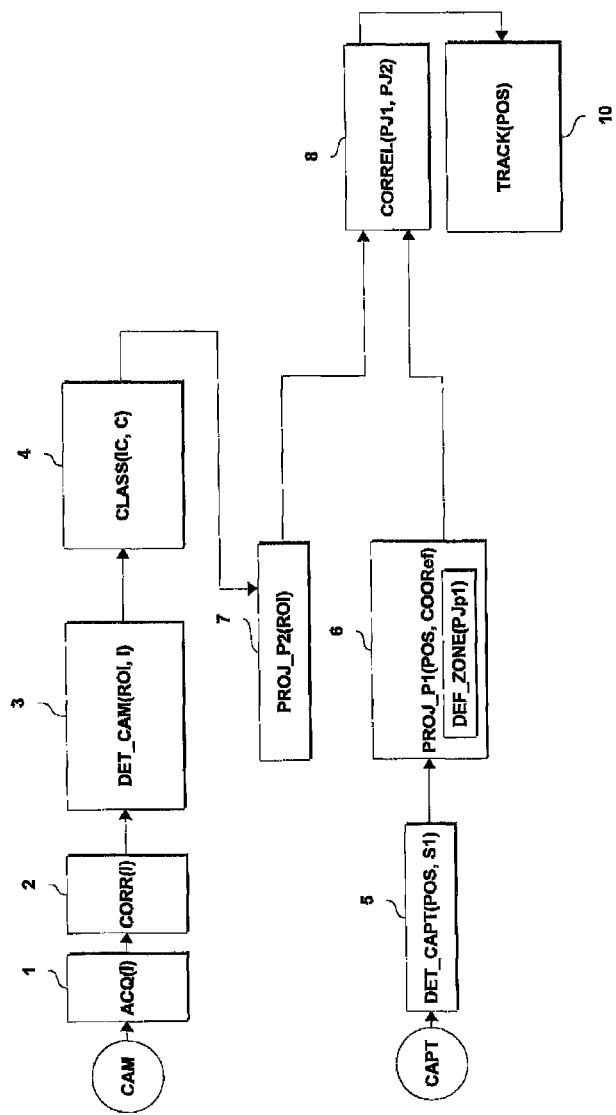
FIG. 1 is an organization chart of a first mode of completion without limitation of the detection procedure according to the invention.
Figure 4:
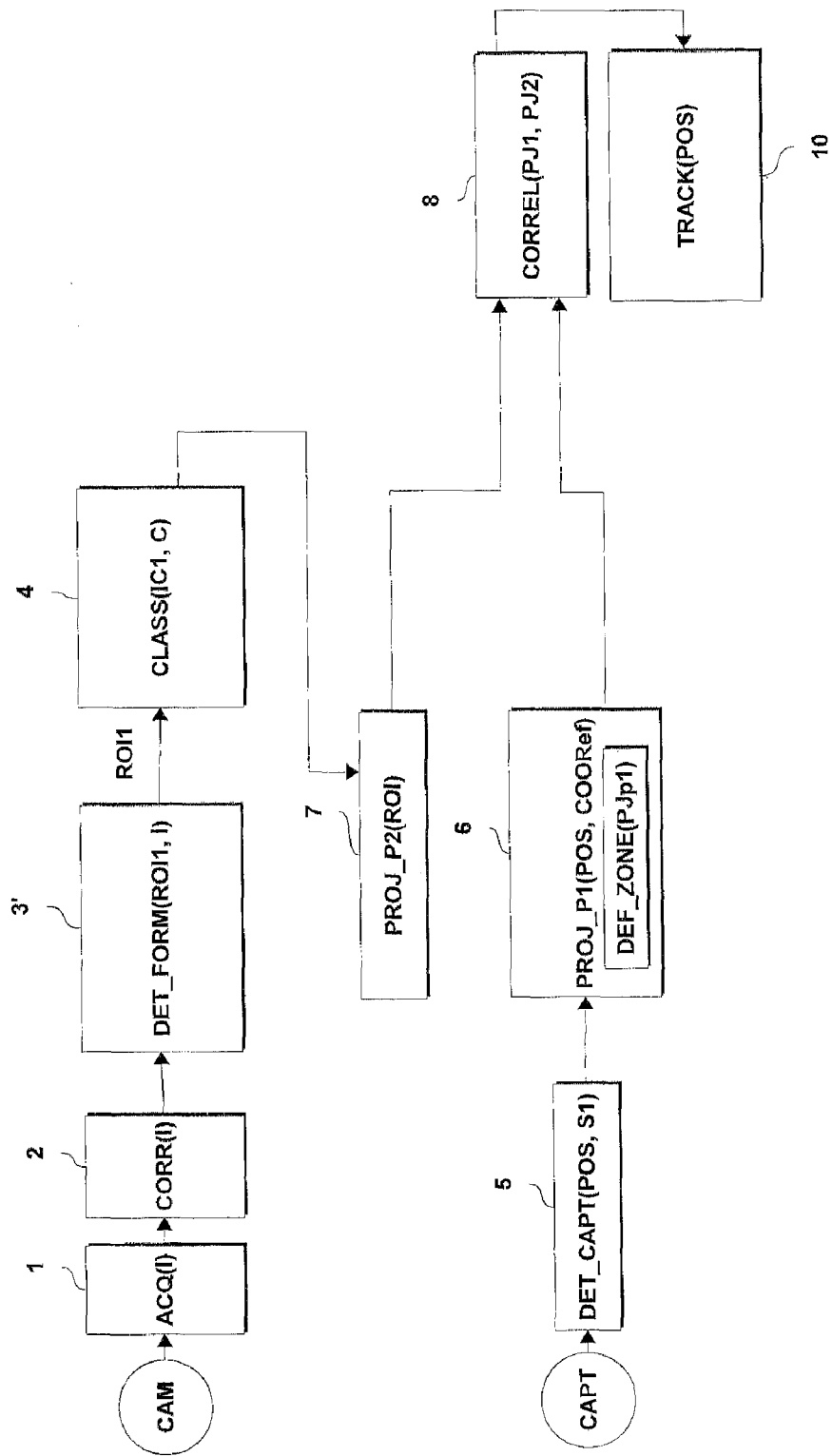
FIG. 4 is an organization chart of the detection procedure of FIG. 1 which illustrates a stage of detection by image processing according to a first mode of completion without limitation.
Figure 13:
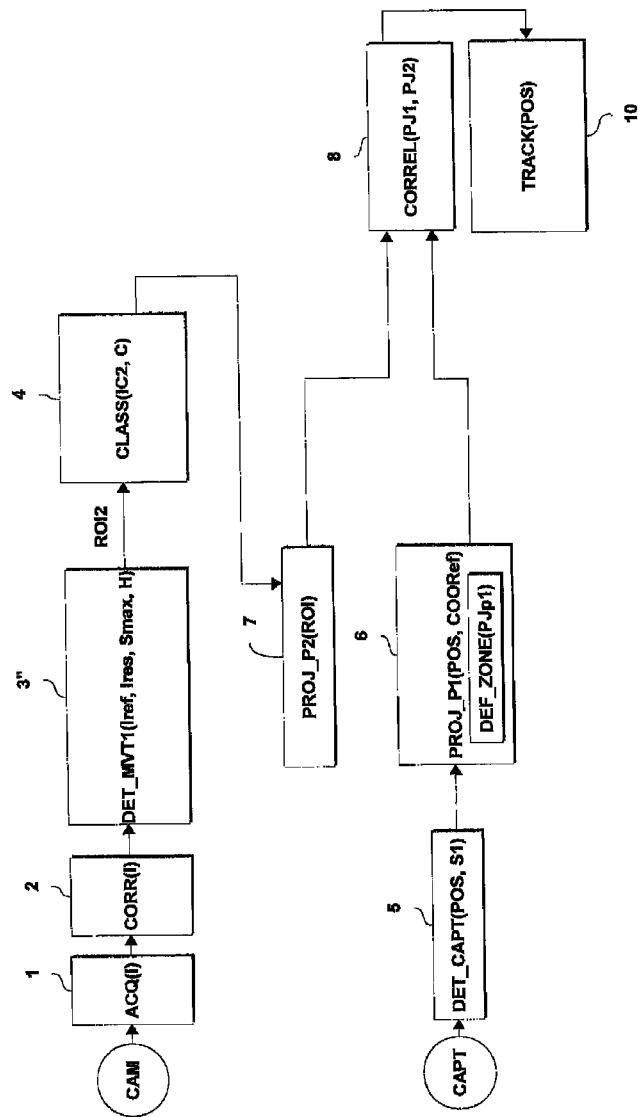
FIG. 13 is an organization chart of the detection procedure of FIG. 1 which illustrates a stage of detection by image processing according to a second mode of completion without limitation.
Figure 26:
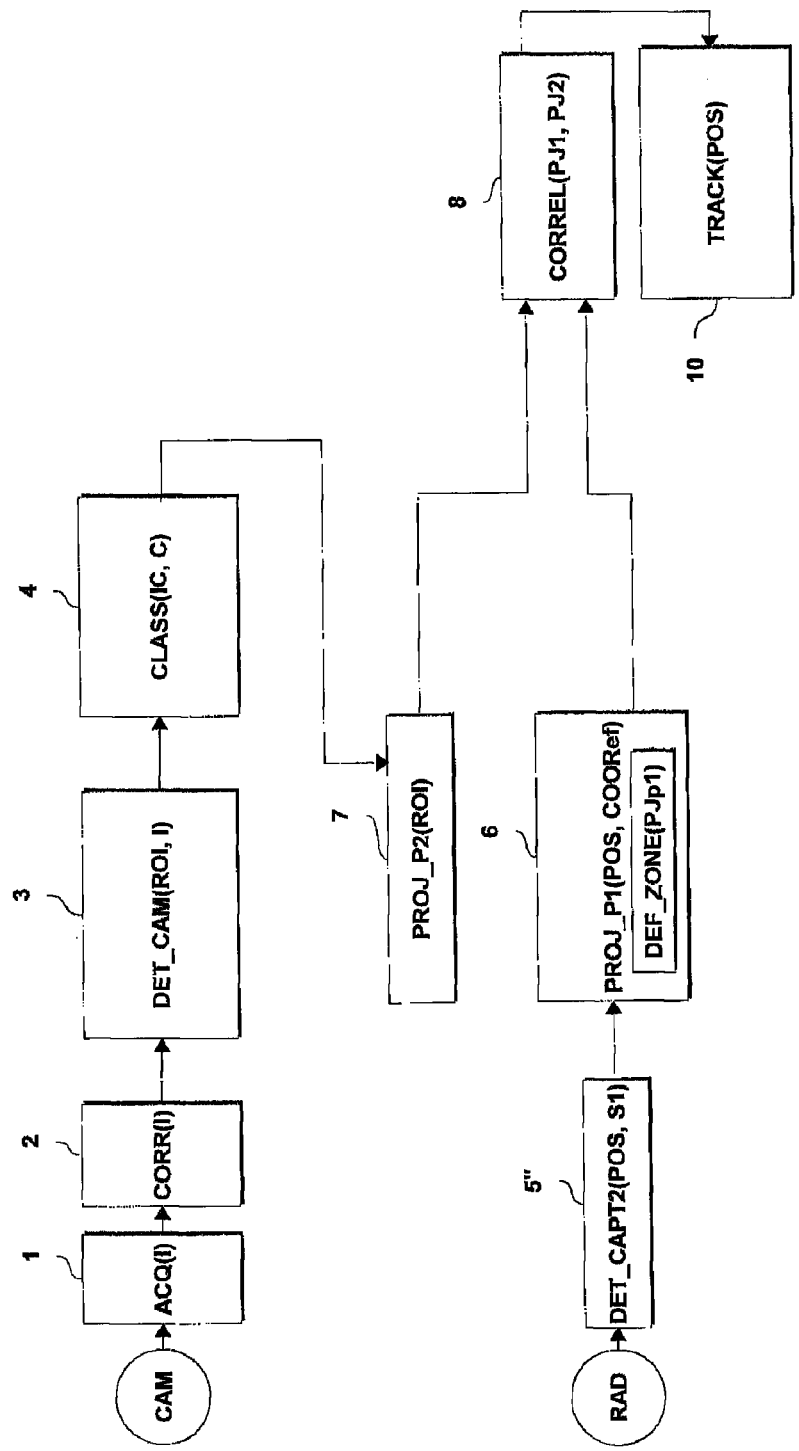
FIG. 26 is an organization chart of the detection procedure of FIG. 1 which illustrates a sensor-operated detection stage according to a second mode of completion without limitation.
Figure 35:
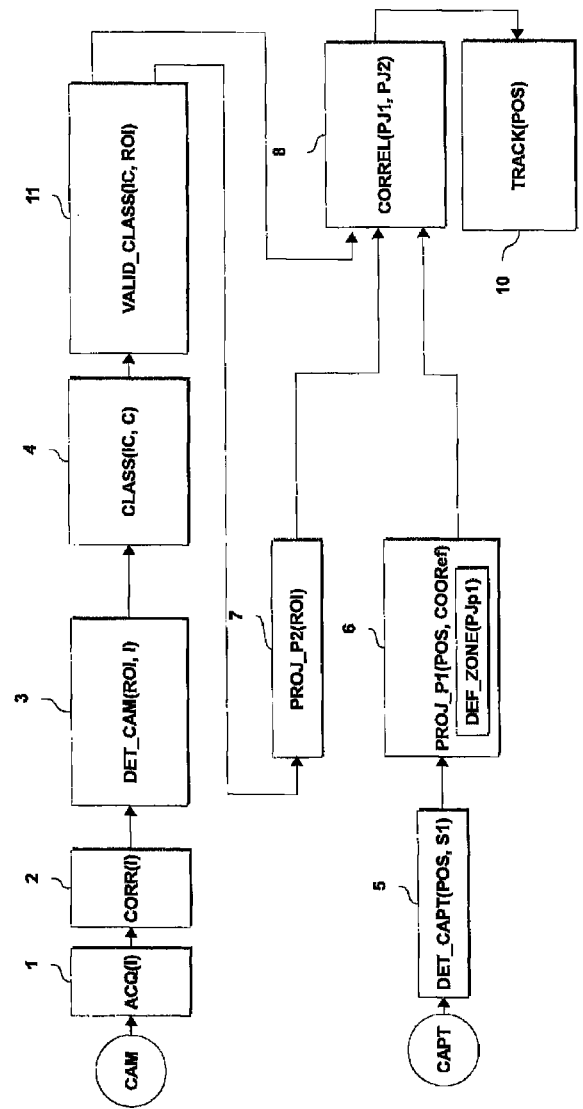
Figure 36:
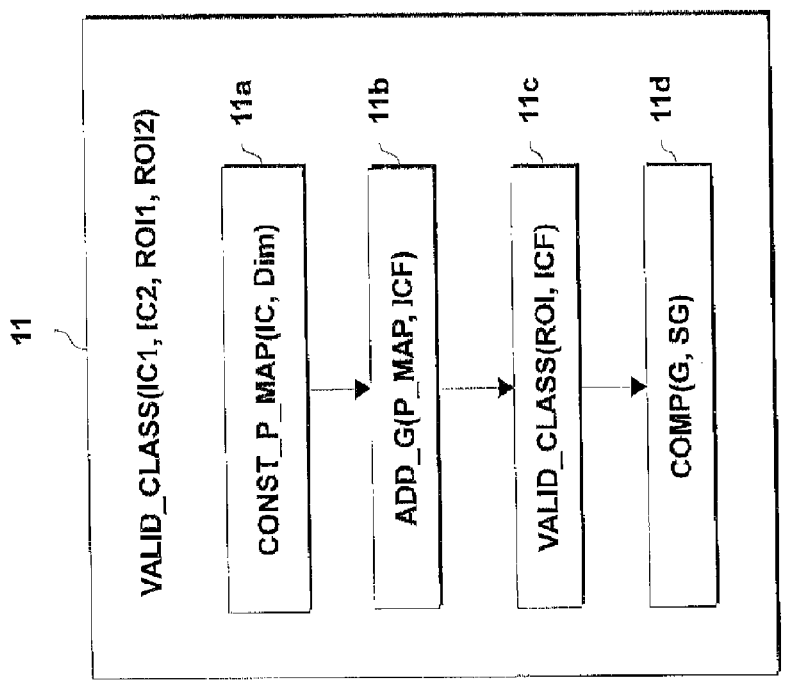
Figure 39:
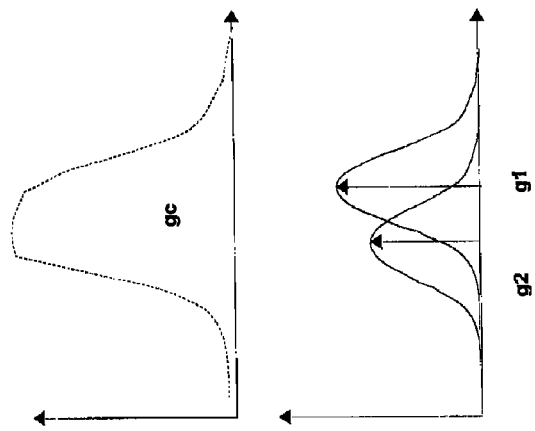
Figure 38:
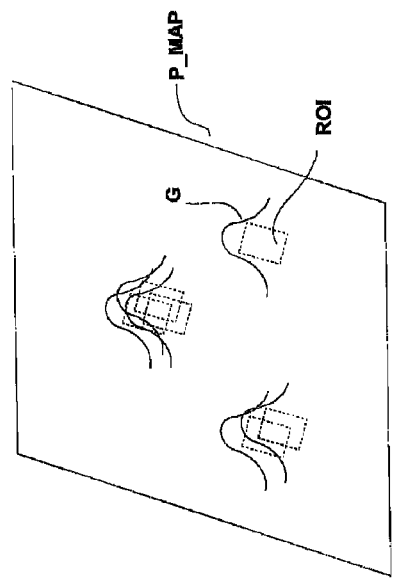
Figure 40:
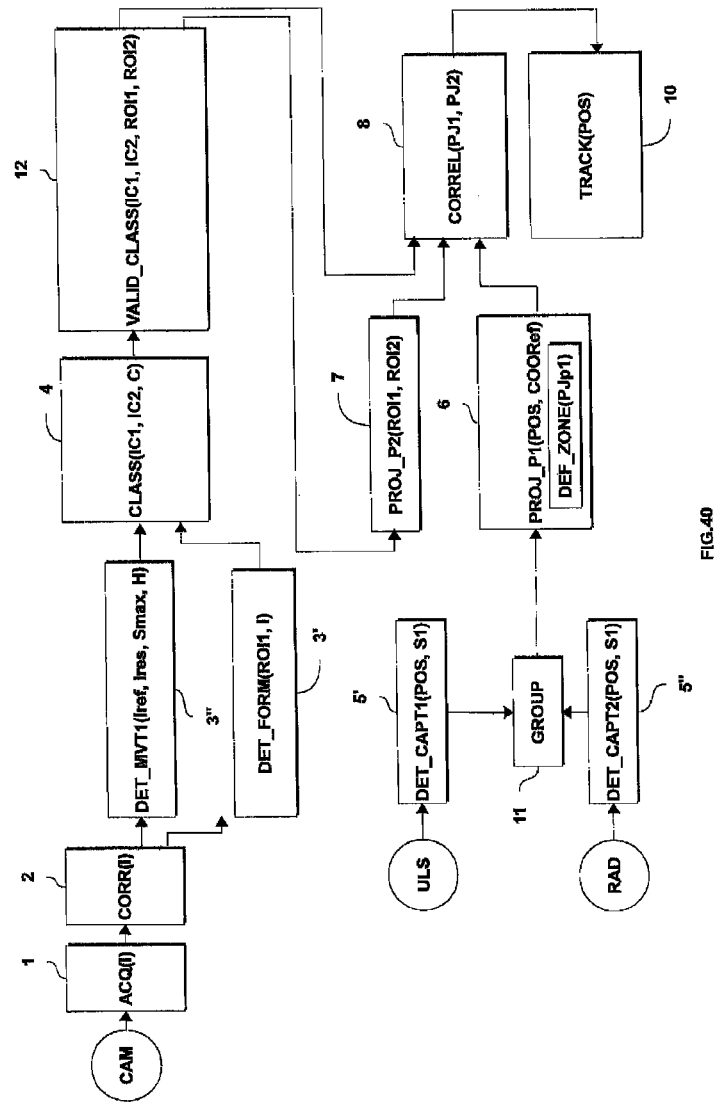
Figure 41:
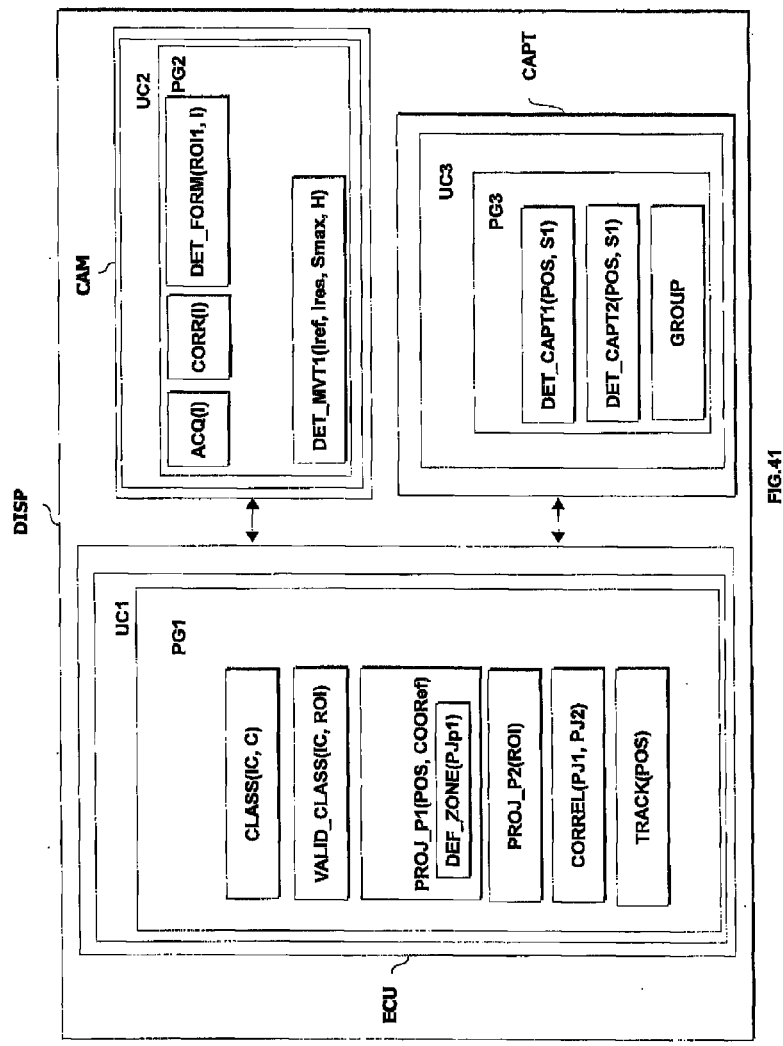

FIG. 32 illustrates the procedure of FIG. 1 including:
  a stage of detection by image processing combining detection by shape recognition according to the first mode of completion of FIG. 4 and movement detection FIG. 13;
  a sensor-operated detection stage combining detection by ultrasound sensors according to the first mode of completion of FIG. 24 and detection by radar sensors according to the second mode of completion of FIG. 26;

FIGS. 33 and 34 are diagrams which explain projections in a reference marker of positions and regions of interest related to detections of obstacles, these projections resulting from a projection stage of the detection procedure of FIG. 1;

FIG. 35 is an organization chart of a second mode of completion without limitation of the detection procedure according to the invention including a validation stage;

FIG. 36 is an organization chart of a mode of completion without limitation of a validation stage of the detection procedure of FIG. 35;

FIG. 37 is a diagram which explains a mode of completion without limitation of the validation stage of FIG. 36;

FIG. 38 is a diagrammatic 3-D representation of Gauss functions explaining their use in the validation stage of FIG. 36;

FIG. 39 is a diagrammatic 2-D representation of Gauss functions explaining their use in the validation stage of FIG. 36;

FIG. 40 illustrated the procedure of FIG. 35 including:
  a stage of detection by image processing combining detection by shape recognition according to the first mode of completion of FIG. 4 and movement detection FIG. 13;
  a sensor-operated detection stage combining detection by ultrasound sensors according to the first mode of completion of FIG. 24 and detection by radar sensors according to the second mode of completion of FIG. 26; and FIG. 41 is a functional block diagram of a mode of completion without limitation of a detection device architecture for commissioning the procedure of FIGS. 1 and 35.

DETAILED DESCRIPTION OF THE PREFERRED EMBODIMENTS

In all the figures, the common elements bear the same reference numbers.

The obstacle detection procedure within the area surrounding a motor vehicle according to the invention is described in a first mode of completion without limitation in FIG. 1.

One will note that the term motor vehicle signifies any type of motorized vehicle.

A. First Mode of Completion

According to this first mode of completion, the detection procedure involves the following stages as illustrated in FIG. 1:
  carrying out a first obstacle detection O by image processing resulting in a definition of at least one region of interest ROI (stage DET_CAM(ROI, I));
  classifying the detected obstacle O with an index of confidence IC applied to the region of interest ROI in relation to given characteristics C (stage CLASS(IC, C));
  carrying out a second obstacle detection O by sensor(s) with detection range below a first threshold S1 resulting in a determined POS position (stage DET_CAPT(POS, S1));
  projecting the determined POS position in a reference marker COORef (stage (PROJ_P1 (POS, COORef));
  projecting the region of interest ROI in this reference marker COORef (stage PROJ_P2(ROI)); and
  aligning the two projections obtained PJ1, PJ2 and attributing a certain POS position to the classified obstacle O in accordance with the alignment (stage CORREL(PJ1, PJ2)).

In one mode of completion without limitation, the detection procedure also involves a further stage of applying a change of perspective to an acquired image (stage CORR(I)).

In one mode of completion without limitation, the detection procedure also involves a stage of acquisition of a sequence SQ of images I (stage ACQ(I)). One will note that this stage may be carried out upstream by another procedure.

In one mode of completion without limitation, the detection procedure also involves a further stage of follow-up of validated regions of interest on a sequence of acquired images. (stage TRACK(POS)). This makes it possible to confirm the presence of a so-called classified region of interest and smooth its position over a whole sequence SQ of images I.

For the rest of the description, in the mode of completion without limitation of the procedure described, the procedure includes these further stages of image acquisitions, change of perspective and follow-up of detection.

The stages of the procedure are described in detail hereafter.

In a first stage 1), one acquires a sequence SQ of images I of the environment E of a vehicle V (stage ACQ(I)).

The acquisition takes place by means of a CAM camera.

As the image acquisition methods are known by the professional, they are not described here.

Figure 3:
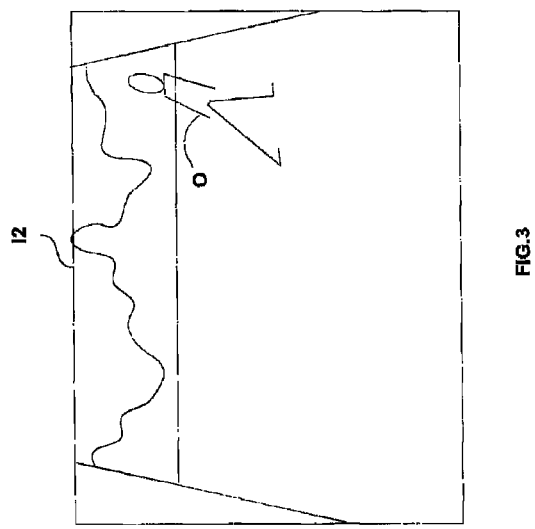
FIGS. 2 and 3 illustrate in diagram form an image used by a stage of change of perspective from the detection procedure of FIG. 1 and a resulting image.
Figure 2:
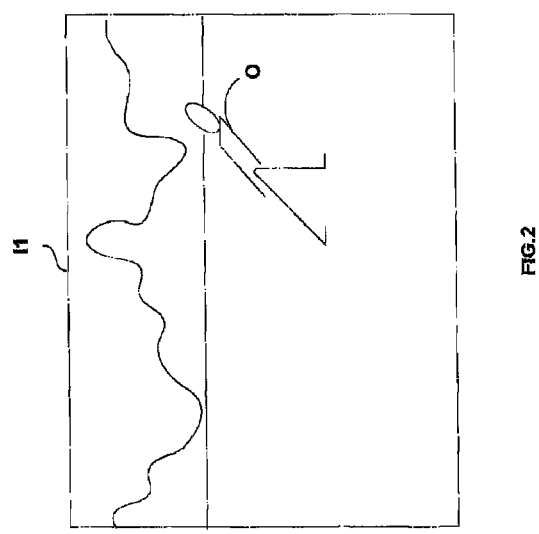

In a second stage 2), one applies a change of perspective to an acquired image I (stage CORR(I)). This makes it possible to counterbalance the distortions due to the CAM camera. One thus restores the obstacles O which are situated at the edge of image I. As illustrated in a diagrammatic example in FIG. 2 and FIG. 3, from an acquired image I1, one obtains an image correction resulting in an acquired image I2.

In a third stage 3), one carries out a first obstacle detection O by image processing resulting in a definition of at least one region of interest ROI (stage DET_CAM(ROI,I)).

1. First Mode of Completion

In a first mode of completion without limitation, the first detection by image processing involves detection by shape recognition in an acquired image of this environment E (stage DET_FORM(ROI1, I) illustrated in FIG. 4.

In one mode of completion, the first detection by shape recognition uses a method well known by the professional called "AdaBoost", described in the document "An Introduction to Boosting and Leveraging by Ron Meir and Gunnar Rätsch—Department of Electrical Engineering, Technion, Haifa 32000 Israel/Research School of Information Science & Engineering—the Australian National University, Canberra, ACT 0200, Australia".

This method is based on:
  an initial apprenticeship stage which uses:
  shape recognition by means of a VIGN label series of reference of a certain size Sz. The present example is based on a VIGN label representing an obstacle O which is a pedestrian. Thus, in one example without limitation, the VIGN label involves a size Sz of 48*24 Px pixels. The series of labels includes a set of so-called positive labels in which a pedestrian is present, and a set of so-called negative labels in which no pedestrian is present; and a genetic algorithm which makes it possible to obtain a set of strong classifiers CLs, a strong Classifier CLs including a sum of several weak classifiers CLw. The obtainment of weak classifiers CLw and strong classifiers CLs is based on a comparison pixel to pixel in the VIGN label series of reference.

A weight is associated with each strong classifier CLs which represents a rate of good detections of an obstacle in relation to the given VIGN label series for several weak classifiers.

A weak classifier CLw consists of a unitary test related to a comparison of a pixel in relation to another pixel in the same label. A weight is likewise associated with it.

The genetic algorithm makes it possible to calculate combinations of weak classifiers CLw applied to the VIGN label series of reference which make it possible to achieve the rate of good detections associated with strong classifiers CLs.

One will note that this apprenticeship stage may be carried out upstream of the described detection procedure.

A use of the "Adaboost" method involves the following stages, as illustrated in FIGS. 5 to 12.

a) Constructing a pyramid of images Isr by recursive sub-sampling of an acquired image I.

In practice, one applies a scale of reduction SR resulting in a sub-sampled image Isr, as illustrated in FIG. 9, and on this image one again applies a scale of reduction SR and so on.

In one mode of completion without limitation, at each iteration a), a different scale of reduction SR is used, as illustrated on the FIGS. 5 to 10. This makes it possible to adapt the detection distances of an obstacle O that one wishes to achieve, and thus achieve the obstacles which are situated at different distances in image I.

Thus, in examples without limitations illustrated in FIGS. 5 to 10:

for the acquired image I, the applied scale of reduction SR1 is 1.2, resulting in the first sub-sampled image Isr1;

for the sub-sampled image Isr1, the applied scale of reduction SR2 is 2, resulting in a second sub-sampled image Isr2;

for the sub-sampled image Isr2, the applied scale of reduction SR3 is 2.3 resulting in a third sub-sampled image Isr3;

for the sub-sampled image Isr3, the applied scale of reduction SR4 is 3, resulting in a second sub-sampled image Isr4;

for the sub-sampled image Isr4, the applied scale of reduction SR5 is 4, resulting in a fifth sub-sampled image Isr5; and for the sub-sampled image Isr5, the applied scale of reduction SR6 is 5, resulting in a sixth sub-sampled image Isr6.

One will note that a scale of reduction SR is taken in accordance with the distance at which one wishes to detect an obstacle O in an acquired image I or reduced image Isr.

The examples without limitations given above make it possible to carry out a detection of an obstacle O between 0 and 9 meters from the vehicle V considered.

b) For each sub-sampled image Isr:

One scans this image Isr with a VIGN label representing a certain obstacle O, in this case a pedestrian. The VGN label has a certain size Sz representing the pedestrian. In one example without limitation, the scanning is carried out from left to right and from top to bottom.

At each successive position of a VIGN label in this image Isr, one analyses its content by means of a set of classifiers Cls, Clw, these classifiers being determined during a phase of prior apprenticeship, as described previously.

Figure 12:
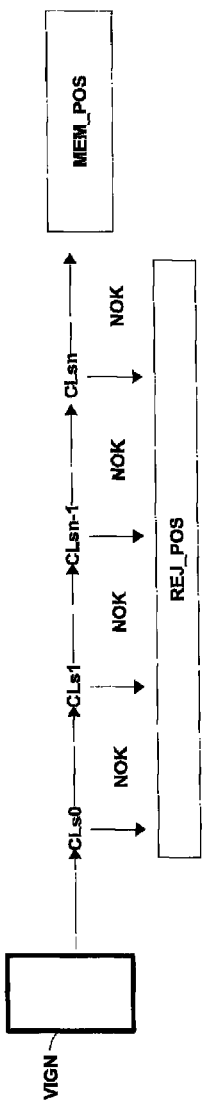
FIG. 12 illustrates as a diagram the sub-stages of detection by image processing according to the first mode of completion of FIG. 4.

Thus, during the scanning, for each POS position of the label in an image Isr, one carries out the following sub-stages illustrated in FIG. 12 (representative of the use of the "Adaboost" method).

i) One applies the combination of weak classifiers CLw of a first strong classifier CLs0 on this VIGN label at the current POS position;

One accumulates the weight of the weak classifiers CLw of which the associated unitary tests are validated, i.e., positive;

One compares the accumulation with the weight of the strong classifier CLs0.

ii) If the result is negative (that is, the accumulation is below the weight of the strong classifier CLs0), one rejects the POS position of the VIGN label (stage REJ_POS). This means that the VIGN label at the current position involves no obstacle O which in this case is a pedestrian. One goes on to the next POS position of the label.

iii) If the result is positive (that is, the accumulation is above the weight of the strong classifier CLs0), one applies the next strong Classifier CLs1 and one repeats stage i). In so far as the result is positive, one goes on to the next strong Classifier CLsn.

Once all the strong classifiers CLs have given a positive result, this means that the VIGN label at the current position involves an obstacle O which in this case is a pedestrian. In this case, one memorizes the POS position of the VIGN label (stage MEM_POS illustrated) and one proceeds to the next position of the VIGN label.

One repeats stages i) to iii) for each POS position of a VIGN label in the image Isr.

One thus obtains a set of memorized POS positions, if applicable, for the sub-sampled image Isr.

Thus, one obtains a set of memorized POS positions of a VIGN label in each acquired or sub-sampled image. Each memorized POS position of a VIGN label thus represents a first region of interest ROI1.

On FIGS. 5 to 10, the label is marked out by a rectangle. Of course, it is possible to give it different shapes.

One will note that the more one increases the value of a scale of reduction SR, the more one detects obstacles, in this case pedestrians, who are close to vehicle V.

Thus, for the first sub-sampled image Isr1, it is the distant obstacles (which enter the VIGN label) that will be detected, whilst in image Isr5 and image Isr6, it is the nearby obstacles (which enter the VIGN label) that will be detected. On the example without limitation of FIGS. 5 to 10, one can see that the represented pedestrian O will be detected only in image Isr5 and image Isr6, because in these two images, it will be included in the VIGN label.

Figure 11:
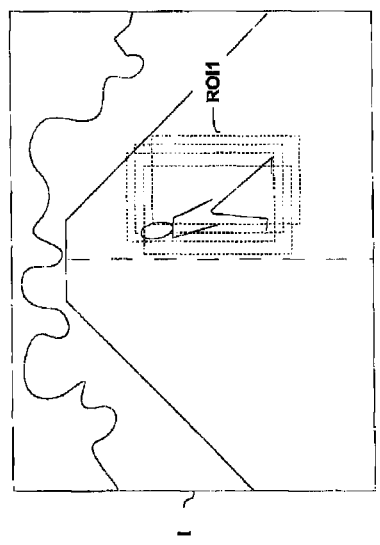

One will note that in another mode of completion, one can alternate the sub-stage of sub-sampling with the sub-stage of scanning and analysis.

c) This set of first regions of interest ROI1 is repositioned in the initial acquired image I, as illustrated in FIG. 11, by multiplying these first regions of interest ROI1 by the scale of reduction SR associated with the image from which they were calculated.

In one mode of completion without limitation, the first detection by shape recognition involves a sub-stage to determine a scanning zone Zb in a sub-sampled image generated from an acquired image I in which an obstacle O may be detected by means of a VIGN label. This sub-stage is applied equally for each sub-sampled image Isr2 to Isr6. This makes it possible to reduce the processing time. In fact, one thus avoids scanning places in an image I where one knows that one cannot detect an obstacle O in a VIGN label because:

obstacle O is bigger than this VIGN label;

obstacle O may not be situated in a part of the image outside the zone, as this part represents the sky.

Thus, in one mode of completion without limitation, the scanning zone Zb involves:
- a top line H marking out a border beyond which no obstacle O may be detected in the image by means of a VIGN label; and
- a bottom line L marking out a border beyond which no obstacle O may be detected in the image by means of the VIGN label.

As one can see in FIG. 5 to 10, the scanning zones Zb1, Zb2, Zb3, Zb4, Zb5 and Z6 (represented by two horizontal dotted lines) were determined for the reduced images Isr1, Isr2, Isr3, Isr4, Isr5 and Isr6 respectively.

In examples without limitations:
- in the sub-sampled image Isr1, the bottom line of scanning zone Zb1 was placed at a distance D of 10 meters;
- in the sub-sampled image Isr2, the bottom line of scanning zone Zb2 was placed at a distance D of 6 meters;
- in the sub-sampled image Isr3, the bottom line of scanning zone Zb3 was placed at a distance D of 3.5 meters;
- in the sub-sampled image Isr4, the bottom line of scanning zone Zb4 was placed at a distance D of 2 meters;
- in the sub-sampled image Isr5, the bottom line of scanning zone Zb5 was placed at a distance D of 1 meters; and
- in the sub-sampled image Isr6, the bottom line of scanning zone Z6 was placed at the bottom edge of the image Isr6.

2. Second Mode of Completion

In a second mode of completion without limitation, the first detection by image processing involves a movement detection in relation to vehicle V on a sequence SQ of acquired images I of this environment E.

In one variant of completion without limitation, the first movement detection (stage DET_MVT1 (Iref, Tres, Smax, H) illustrated in FIG. 13) involves the following sub-stages.

a) Constructing a background Image Iref recalculated for each image I of an image sequence SQ.

In one mode of completion without limitation, this stage uses a method well known by the professional called the "Running Average Method", described in the document G. Christogiannopoulos, P. B. Birch, R. C. D. Young, C. R. Young, "Segmentation of moving objects from cluttered background scenes using a running average model". SPIE Journal, vol 5822, pp. 13-20. 2005. This method is also known as "Background Removal".

Figure 14:
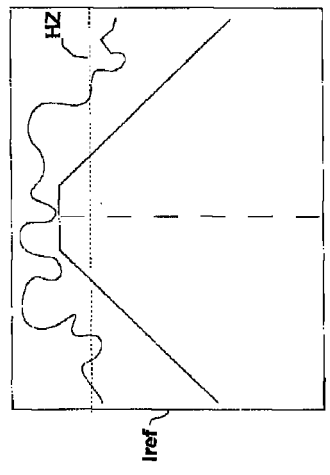
FIGS. 14 to 16 illustrate in diagram form certain images used by a stage of detection by image processing according to the second mode of completion of FIG. 13.
Figure 15:
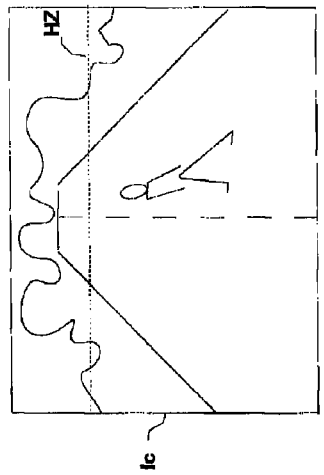
Figure 16:
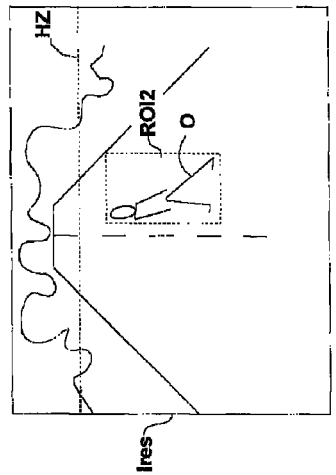

Thus, as illustrated on the example without limitation of FIG. 14 to 16, in one mode of completion without limitation, for each acquired current image Ic (of a sequence of images SQ) in which is situated at least one obstacle O, in this case a pedestrian, one calculates an image of reference Iref such that:

$$Iref = \alpha * Ic + (1-\alpha) * Iref.$$

With α a percentage of apprenticeship.
In one example without limitation, α=0.05
This percentage of apprenticeship means that one retains 5% of the new Image Ic and 95% of the previous Image Iref.

In other words, the background evolves according to the movement of the objects (including obstacles) in the image.

One will note that the first image of reference Iref is the first acquired image I in the acquired sequence SQ.

b) Taking out the background Image Iref to the current Image Ic in the sequence of image SQ, resulting in a resulting Image Ires.

After obtaining background Image Iref, one thus takes out the first acquired Image Ic to this background Image Iref and one obtains a resulting Image Ires.

One thus has Ires=Absolute value (Ic−Iref).

One carries out this stage on the set of acquired images I of the sequence of images SQ.

c) Discriminating certain movements in the resulting Image Tres according to an Smax threshold.

In one variant of completion without limitation, one compares the intensity of each pixel of the resulting Image Tres with this Smax threshold. If the intensity is above the Smax threshold, this means that there is movement in the resulting Image Ires.

d) Extracting second regions of interest ROI2 from the discrimination.

To this effect, in one variant of completion without limitation, one binarizes the resulting image as follows:

One compares all the Px pixels of a resulting Image Ires to a threshold of maximum intensity Sbr representing noise BR.
- If the value of a Px pixel is below this intensity threshold Sbr, one positions its value at zero (black) in an example without limitation.
- Otherwise one positions its value at 255 (white) in an example without limitation.

In one example without limitation, in order to define the intensity threshold Sbr:
- one extracts from each resulting Image Ires the maximum intensity value of levels of grey.
- one establishes the intensity value threshold Sbr equal to a percentage of this maximum value, the percentage being representative of the noise BR.

In one example without limitation, the percentage is 20%.

Thus, by carrying out a binarization of the resulting Image Tres, one removes noise BR and one shows second regions of interest ROI2 representative of a moving obstacle O.

One thus distinguishes a moving obstacle O from noise.

One will note that noise BR may be for example the shadow on the ground of a tree which moves due to the wind, or even a change of light intensity on the image due to moving clouds, for example.

In one mode of completion without limitation, the second detection DET_MVT1 also involves the following stages.

a) Regrouping the regions of interest ROI2 of each resulting Image Tres which tally between them. The regions of interest ROI2 which tally between them actually represent the same obstacle O.

b) Defining rectangles around these second regions of interest ROI2 obtained, as these rectangles now define these second regions of interest ROI2.

In one mode of completion without limitation, to determine the rectangle, one takes the minimum and maximum extremities of a region of interest ROI2.

In one mode of completion without limitation, the regions of interest ROI2 which are situated above a line characteristic of the horizon HZ (illustrated in FIGS. 14 to 16) in an acquired image I are not taken in account. In fact, one knows that an obstacle such as a pedestrian may not be situated above the horizon line HZ, that is, in the sky. This makes it possible to reduce the number of calculations to be carried out.

3. Third Mode of Completion

In a third mode of completion without limitation as illustrated in FIG. 17, the first detection by image processing is a combination of:
- detection by shape recognition in an acquired image of this environment E according to the first mode of completion; and
- movement detection in relation to vehicle V on a sequence SQ of acquired images I of this environment E.

One thus obtains the first regions of interest ROI1 and the second regions of interest ROI2.

In a fourth stage 4), one classifies the obstacle O detected with, respectively, an index of confidence IC applied to the region of interest in relation to given characteristics C (stage CLASS(IC, C)).

One recalls that the regions of interest ROI1, ROI2 are the regions determined during stage 3.

One will remark that prior to this classification stage, one determines two types of populations, one of which represents a pedestrian as follows. One will note that this determination is in general carried out upstream of the described detection procedure.

From several M labels of reference VIGNref some of which include an obstacle such as a pedestrian and one part does not include any obstacle, one constructs histograms of reference HISTREF from the orientation contours detected in these labels (sub-stage CONST_HISTREF(VIGNref)).

Thus, in one mode of completion without limitation, the characteristics given are of histograms of orientated gradients. In one example without limitation, nine orientations are used (corresponding to nine directions over 360°). This makes it possible to obtain a good compromise between the calculation time and the quality of the classification.

At each pixel of a contour of a VIGN labelref, one calculates an orientation and one looks at to which of the nine orientations OR it belongs.

One accumulates the NORM standards of the orientations on the set of the pixels of the contours of a VIGN labelref. One thus obtains a histogram of reference as illustrated in FIG. 19.

Figure 20:
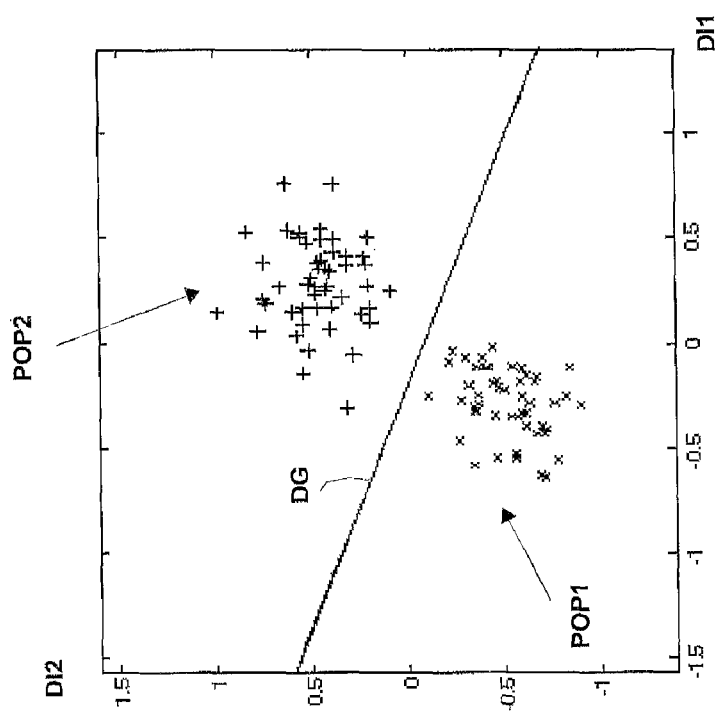

One thus obtains Histograms M of reference which may be divided into two types of populations (a population with a pedestrian or a population without) as illustrated as a diagram in 2D (DI1, DI2) in FIG. 20. One will note that as a "histogram" vector has 9 dimensions here, a more adequate representation would be in 9 dimensions. For the sake of simplicity, only 2 dimensions were represented. In order to dissociate these 2 populations, an algorithm of apprenticeship determines a border of decision.

In one mode of completion without limitation, one constructs this border by a separator with a vast margin, a method known by the professional as the SVM ("Support-Vector Machine") method—published by Kluwer Academic Publishers, Boston and written by Corinna Cortes and Vladimir Vapnik.

Figure 21:
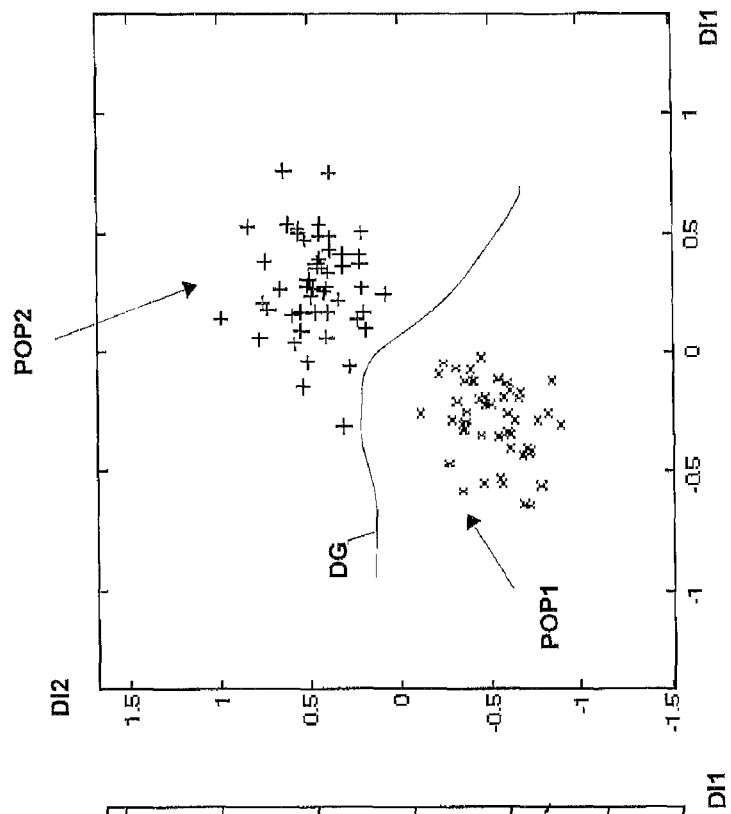
FIGS. 20 and 21 are diagrams of spreading the index of confidence which explains a mode of completion without limitation of the classification stage of obstacles of FIG. 18.

The edge DG may, without limitation, be a polynomial function (for example FIG. 20) or a Gauss function (for example FIG. 21).

The classification stage involves the following sub-stages.

a) Creation of a vector of characteristics (C) from the regions of interest ROI1 and ROI2 determined during previous stages (by shape recognition and movement detection respectively according to the first mode of completion DET_MVT1), one constructs histograms HIST of orientated gradients C (sub-stage CONST_HIST(ROI1, ROI2) illustrated in FIG. 18). In one example without limitation, nine gradients C are used. One obtains 9-dimensional "histogram" vectors.

b) One classifies this vector of characteristics C by comparison with a border of decision DG determined previously during an apprenticeship stage (as described above) (sub-stage COMP(HIST, DG) illustrated in FIG. 18).

To this effect, one then compares the "histogram" vectors obtained with the border of decision DG. The more one retreats from the border, the greater the likelihood of belonging to a population. Furthermore, the more one approaches the border, the more ambiguous is the fact of belonging to a population.

c) One determines an associated index of confidence IC according to the distance of the vector of characteristics in relation to this border of decision DG (sub-stage DET(IC1, IC2) illustrated in FIG. 18).

One thus defines the first and second indices of confidence IC1, IC2 applied to the first regions of interest ROI1 and to the second regions of interest ROI2 respectively, and thus to the constructed "histogram" vectors HIST respectively.

Thus, the closer a "histogram" vector HIST is to the border DG, the closer is the associated index of confidence IC to 0.5 for example (in the case where the value of an index of confidence is situated between 0 and 1).

On the contrary, the further away a "histogram" vector HIST is from the border DG in the region POP1, the higher the index of confidence IC1 of belonging to the population POP1, and the weaker the index of confidence of belonging IC2 to the population POP2.

In the example without limitation taken in FIGS. 20 and 21, the first POP1 represents the first population representing a pedestrian. In this case, the index of confidence IC1 is close to 1 when it is far from the border DG and in this region POP1.

One thus classifies an obstacle O with the indices of confidence IC1, IC2 applied to the first and second regions of interest ROI1, ROI2 respectively, in relation to the histogram vectors HIST, the classification making it possible to determine the category of the obstacle to which it belongs, which in this case may or may not be a pedestrian.

In a fifth stage 5), one carries out a second obstacle detection O by sensor(s) with detection range below a first threshold S1 resulting in a determined POS position (stage DET_CAPT(POS, S1)).

First Mode of Completion

Figure 22:
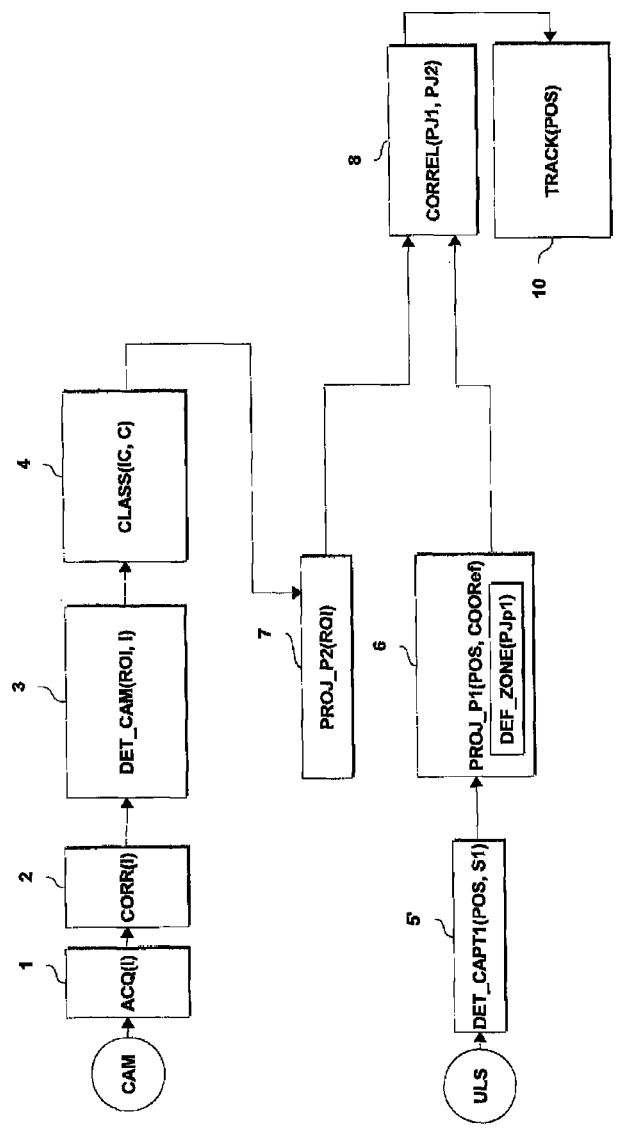
FIG. 22 is an organization chart of the detection procedure of FIG. 1 which illustrates a sensor-operated detection stage according to a first mode of completion without limitation.
Figure 31:
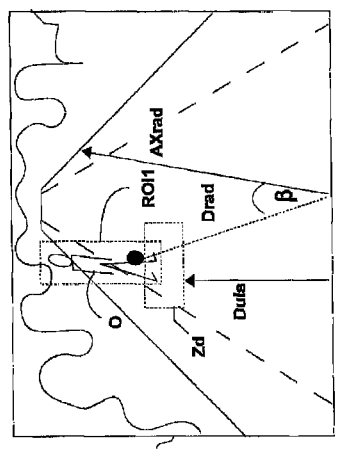
FIG. 31 illustrates an obstacle as well as parameters related to its position and detected by an ultrasound sensor-operated detection device of FIG. 24 and by a radar sensor-operated detection device of FIG. 26.

In a first mode of completion without limitation illustrated in FIG. 22, the second detection is carried out by means of ultrasound sensors ULS (stage DET_CAPT1 (POS, S1)). The first threshold S1 is representative of the maximum detection range of an ultrasound sensor ULS. In one example without limitation, the first threshold S1 is then equal to 4 meters. As detection by ultrasound sensors is known by the professional, it is not described here. One will note only that the resulting determined POS position involves a distance Duls between the obstacle O and the ultrasound sensor of vehicle V and a detection zone Zd (which is of rectangular shape) as illustrated in the diagrammatic example without limitation of FIG. 31.

One will note that the fact of carrying out detection by means of a camera (whether by shape recognition or movement detection) combined with detection by ultrasound sensors (as illustrated in FIG. 24) makes it possible to cover a wider detection zone (as illustrated in FIG. 25) than by detection by camera only (as illustrated in FIG. 23).

Second Mode of Completion

In a second mode of completion without limitation illustrated in FIG. 26, the second detection is carried out by means of radar sensors RAD (stage DET_CAPT2(POS, S1)). The first threshold S1 is representative of the maximum detection range of a radar sensor RAD. In one example without limitation, the first threshold S1 is then equal to 60 meters. As detection by radar sensors is known by the professional, it is not described here. One will note only that the resulting determined POS position involves a distance Drad between the obstacle O and the radar sensor of vehicle V and an angle $\beta$ between the obstacle and the axis of the radar sensor as illustrated in the diagrammatic example without limitation of FIG. 31.

Figure 28:
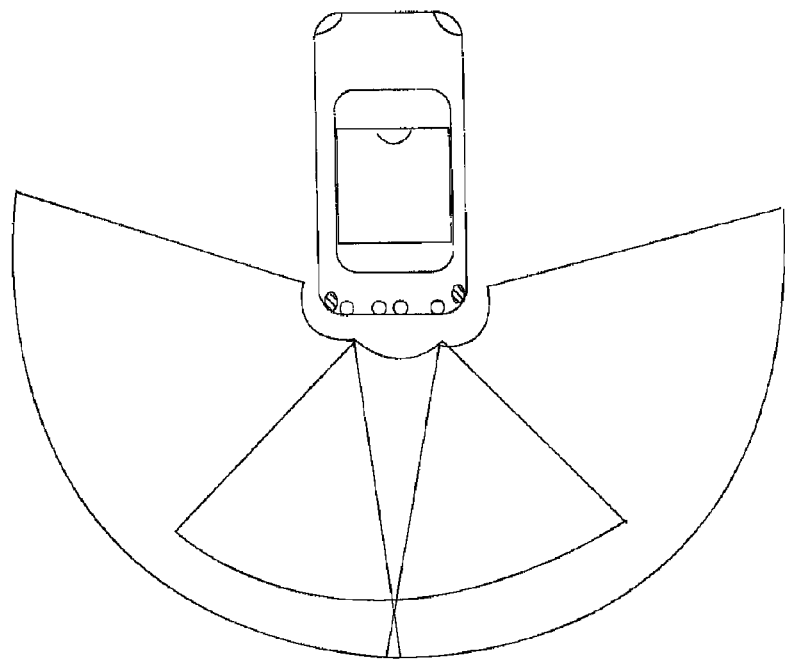
FIG. 28 illustrates in diagram form a vehicle including an image acquisition device of FIG. 23 and a radar sensor-operated detection device of FIG. 27 as well as their respective detection zone.
Figure 27:
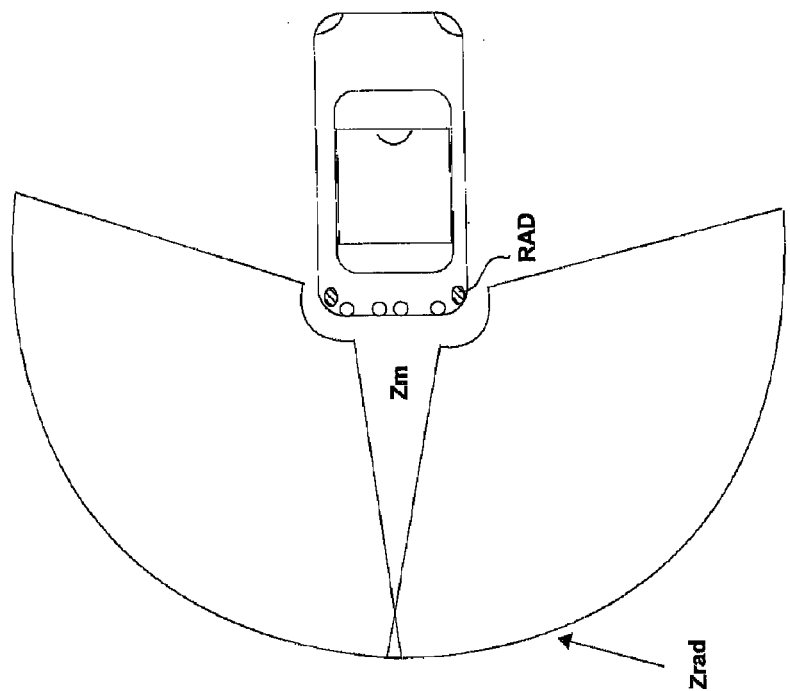
FIG. 27 illustrates in diagram form a vehicle including a radar sensor-operated detection device according to the second mode of completion without limitation of FIG. 26 and a detection zone of this detection device.

One will note that the fact of carrying out detection by means of a camera (whether by shape recognition or movement detection) combined with detection by radar sensors (as illustrated in FIG. 27) makes it possible to cover a wider detection zone (as illustrated in FIG. 28) than by detection by camera only (as illustrated in FIG. 23). Furthermore, one will note that this avoids having a dead zone Zm where the obstacles O are not detected when only radar sensors RAD are used.

Third Mode of Completion

Figure 29:
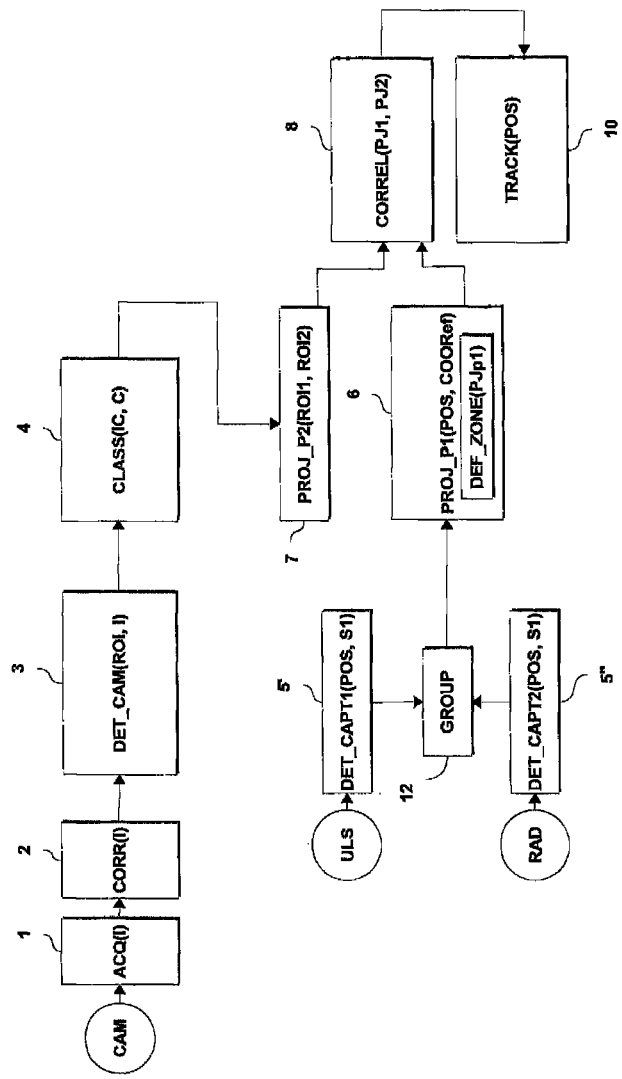
FIG. 29 is an organization chart of the detection procedure of FIG. 1 which illustrates a sensor-operated detection stage combining the first mode of completion of FIG. 24 and the second mode of completion of FIG. 26.

In a third mode of completion without limitation illustrated in FIG. 29, the third detection is carried out by means of ultrasound sensors ULS and radar sensors RAD. In this case, the third detection involves a stage of regrouping the detections carried out on the same obstacle O by the ultrasound sensors ULS and radar sensors RAD (sub-stage GROUP illustrated in FIG. 29).

In one mode of completion without limitation, the regrouping is carried out by means of a comparison between the sensor distances Duls and Drad obtained. One compares each distance Duls with each distance Drad. If the difference of distances Diff1 obtained from the comparison is below a determined threshold S4, then one considers that it is the same obstacle O which was detected by both types of sensors ULS and RAD. In one example without limitation, the threshold S4 is 50 cm.

In this case (Diff1<=S4), in one mode of completion without limitation, one only retains the POS position detected by the radar sensor RAD (detection by the latter being more accurate in general than detection by an ultrasound sensor ULS).

Otherwise (Diff1>S4), one estimates that the detections do not correspond to the same obstacle O and they are retained in so far as one could not regroup them with other detections.

One thus obtains a list of detected obstacles O in which one has deleted the double detections.

Figure 30:
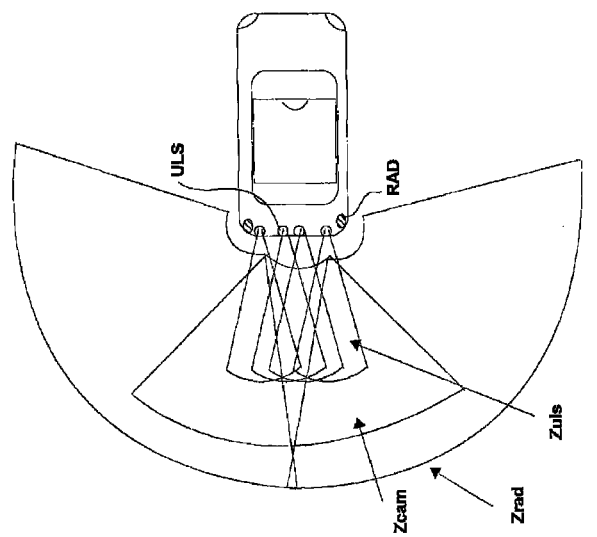
FIG. 30 illustrates in diagram form a vehicle including an image acquisition device of FIG. 23, an ultrasound sensor-operated detection device of FIG. 24 and a radar sensor-operated detection device of FIG. 26 as well as their respective detection zone.

One will note that the fact of detecting obstacles by sensors by using both ultrasound sensors ULS and radar sensors RAD gives a very wide cover of detection. In fact, as one can see in FIG. 30, the cover of detection Zuls by ultrasound makes it possible to cover a zone close to the vehicle and in front of the vehicle, whilst the cover of detection Zrad makes it possible to cover a zone further from the vehicle and on the sides of the vehicle, as illustrated in FIG. 30. One will remark that in the latter detection by radar, there is an undetected zone Zm which is also called a dead zone.

The fact of carrying out detections by means of both types of sensors ULS and RAD makes it possible to cover the dead zone Zm as illustrated in FIG. 27.

Furthermore, one will note that the fact of carrying out detection by means of a camera (whether by shape recognition or movement detection) combined with detection by sensors makes it possible to locate more precisely the detected obstacles in the vehicle marker, whether a combination with detection by ultrasound sensors ULS alone (as illustrated in FIG. 25) or by radar sensors RAD alone (as illustrated in FIG. 28) or by ultrasound and radar sensors (as illustrated in FIG. 30).

One will note that once the third mode of completion of the detection by image processing and the second movement detection are used, one obtains as illustrated in FIG. 32:
  detection by image processing including:
    detection by shape recognition DET_FORM(ROI1, I);
    movement detection DET_MVT1 (Iref, IS, Smax, H);
      detection by sensors including:
    detection by ultrasound sensors ULS DET_CAPT1 (POS, S1);
    detection by radar sensors RAD DET_CAPT2(POS, S1).

In a sixth stage 6), one projects the POS position defined in a reference marker COORef (stage PROJ_P1 (POS, COORef)).

In one mode of completion without limitation, the reference marker COORef is the image marker XI; YI. This makes it possible to minimize the impact of detection errors when calculating the distance in the image of an obstacle O, as opposed to a solution in which a vehicle marker would be taken in account.

In one example without limitation, one will note that in order to carry out the projection of the POS position in the image marker XI; YI, it is sufficient to know the correspondence between the position in the image marker and the position in the vehicle marker Xv, Yv.

The projection is carried out according to a matrix of projection MP as follows.

$$\begin{matrix} -3.353858 & 3.332719 & 1029.732666 \\ -0.077005 & 1.159693 & 467.425964 \\ -0.000233 & 0.009181 & 1.000000 \end{matrix}$$

Equation $[Xl, Yl] = f(Xv, Yv)$ $xi' = Xv * 50$ $yi' = Yv * 50 - 200$ $w = 1/(xi' * MP(3.1) + yi' * MP(3.2) + MP(3.3))$ $xi = (xi' * MP(1.1) + yi' * MP(1.2) + MP(1.3)) * w$ $yi = (xi' * MP(2.1) + yi' * MP(2.2) + MP(2.3)) * w$ One obtains certain first projections PJ1, as illustrated in diagram form in FIG. 33 and FIG. 34, corresponding to obstacles O. the POS position of which was detected by the sensors, whether ultrasound ULS and/or radar RAD.

One will note that the projection PJ1 of a POS position of an obstacle O determined by an ultrasound sensor ULS gives a rectangle. In the example illustrated in FIG. 33, there are four rectangles PJ11, PJ13, PJ15, PJ17 (in dotted lines).

Furthermore, the projection PJ1 of a POS position of an obstacle O determined by a radar sensor RAD gives a point. In the example illustrated in FIG. 34, there are four points PJ12, PJ14, PJ16, PJ18.

The same applies in the case where both types of sensors (radar and ultrasound) were used.

In both cases (ultrasound sensors or radar sensors), this projection stage of the POS position also involves a sub-stage of defining, from a projection PJ1, an associated projection zone PJ1p.

In one mode of completion without limitation, the width of the projection zone PJ1p is centered on the projection PJ1 and the base of the projection zone is at a tangent to the projection point PJ1 (in the case of a point), as illustrated in FIG. 34, or at the base of the projection rectangle PJ1 (in the case of a rectangle) as illustrated in FIG. 33.

In one example without limitation, one takes the dimensions of a projection zone equal to 1.7 m in height by 0.7 m in width. The dimensions of this projection zone PJ1p are thus determined so that they correspond to those of a pedestrian.

Thus, in the example illustrated in FIG. 33, there are four projection zones PJ11p, PJ13p, PJ15p, PJ17p associated with the four rectangles PJ11, PJ13, PJ15, PJ17 respectively.

Thus, in the example illustrated in FIG. 34, there are four projection zones PJ12p, PJ14p, PJ16p, PJ18p associated with the four projection points PJ12, PJ14, PJ16, PJ18 respectively.

In a seventh stage 7), one projects the regions of interest ROI in this reference marker COORef and one attributes a determined POS position to the classified obstacle O in accordance with the alignment (stage PROJ_P2(ROI)).

One obtains certain second projections PJ2, as illustrated in diagram form in FIG. 33 and FIG. 34, corresponding to the validated regions of interest ROI. One will note that the projections PJ2 are in the shape of rectangles. In the example illustrated, there are three corresponding rectangles PJ21, PJ22, PJ23 (in uninterrupted strokes).

One recalls that the regions of interest ROI are the regions of interest ROI1, ROI2 (defined in stage 3).

In an eighth stage 8), one aligns the two projections obtained PJ1, PJ2 (stage CORREL(PJ1, PJ2)).

In one mode of completion without limitation, the alignment is a comparison between two projections PJ1, PJ2 which is carried out according to the following criteria:
 a surface of covering Sr between two projections PJ1, PJ2;
 a ratio Rt in height between the size of the two projections PJ1, PJ2; and
 a difference Diff2 of distances between two projections PJ1, PJ2.

One will note that the distance of a projection PJ1 is the distance Duls or Drad given by the CAPT sensor.

Furthermore, the distance of a projection PJ2 is the distance detected in an image I of a region of interest ROI and recalculated in the vehicle marker V by the matrix of projection MP.

In examples without limitations:
 the surface of covering Sr is 70%;
 the ratio Rt is situated between 0.5 and 1.5; and
 the difference Diff2 is 1 meter.

One recalls that the projection PJ1 of detection by sensors is represented by the projection zone PJ1$p$ described previously. Thus, in practice, the comparison is carried out between a projection zone PJ1$p$ and a projection PJ2.

Thus, in the case where all these criteria are fulfilled, one estimates that the alignment between two projections PJ1, PJ2 is positive. Otherwise, one retains the projection PJ1, PJ2 until an alignment is found with another projection PJ2, PJ1 respectively.

If no alignment is found, then it is considered negative.

In the diagrammatic example of FIG. 33:
the projections PJ21, PJ11$p$
 tally;
 Sr>70%;
 Rt is situated between 0.5 and 1.5;
 Diff2<1 m.
 the projections PJ22, and PJ13$p$
  tally;
  Sr<70%;
  Rt is situated between 0.5 and 1.5;
  Diff2>1 m.
 the projections PJ23, and PJ15$p$
  tally;
  Sr<70%;
  Rt is situated between 0.5 and 1.5;
  Diff2<1 m.
In the diagrammatic example of FIG. 34:
the projections PJ21, PJ12$p$
 tally;
 Sr>70%;
 Rt is situated between 0.5 and 1.5;
 Diff2<1 m.
 the projections PJ23, and PJ16$p$
  tally;
  Sr<70%;
  Rt is situated between 0.5 and 1.5;
  Diff2>1 m.

One attributes a determined POS position to the classified obstacle O in accordance with the alignment.

Thus, once the alignment is positive, one deduces from this that the corresponding obstacle O is a pedestrian and in one mode of completion without limitation, one attributes to it:
 the associated POS position detected by the sensors; and
 the associated region of interest ROI arising from the classification.

Furthermore, in one mode of completion without limitation, one increases its associated index of confidence IC. In one example without limitation, the new index of confidence IC=IC+(1−IC)/2.

In another mode of completion, one can associate with it:
 the estimated position in the vehicle marker (of the associated region of interest); and
 the associated projection zone defined PJ1$p$.

One will note however that the POS position detected by the sensors is more accurate than the estimated position, and that the region of interest ROI is likewise more accurate than the defined projection zone.

If no alignment is found for a projection PJ1 or PJ2 then:
 in one mode of completion without limitation, one carries out the following tests:
  if the projection is a sensor projection PJ1, one then deduces that the detected obstacle O is not a pedestrian;
  if the projection is a projection PJ2 of a region of interest ROI, then
   if the index of confidence IC associated with it is above a threshold of confidence Sc;
    one then deduces that the detected obstacle O is a pedestrian;
   otherwise, one deduces from this that the detected obstacle is not a pedestrian and one positions its index of confidence IC at 0.

In one example without limitation, the threshold of confidence Sc=0.7.

In a ninth stage 9), one carries out a follow-up of the regions of interest ROI classified on a sequence SQ of acquired images (stage TRACK(POS)).

In one example without limitation, one uses a method well known by the professional called ESM ("Efficient Second Order Method") developed by the INRIA and described in the document "Benhimane, E. Malis, Real-time image-based tracking of planes using efficient second-order minimisation IEEE/RSJ International Conference on Intelligent Robots Systems, Sendai, Japan, 2004".

This method is based on a research of the same pattern in a sequence SQ of acquired images I, particularly between a current image and an image of reference, and on the repetition of this pattern in a certain number of images I of the sequence SQ. This avoids losing a detection of obstacle O in the case where an obstacle O would not be detected on an image I of a sequence SQ, while it was detected on the other images I.

B) Second Mode of Completion

The obstacle detection procedure within the area surrounding a motor vehicle according to the invention is described in a second mode of completion without limitation in FIG. 35.

In addition to the set of the stages described in the first mode of completion of FIG. 1 (and its variants of completion), according to this second mode of completion, the detection procedure involves a further stage (tenth stage) of validating the classification of the detected object O in relation to regions of interest ROI and indices of confidence IC determined during the first detection and/or classification. This validation stage is thus carried out before stage 9) described previously (stage of attribution of a determined POS position to a classified obstacle O) and as one will see hereafter before stage 7) described previously (projection of regions of interest ROI in the reference marker COORef).

In one mode of completion without limitation, the validation involves the following sub-stages as illustrated in FIG. 36.

10a) Constructing a probability card P_MAP corresponding to an image I in which each classified region of interest ROI1, ROI2 is represented by a distribution of probability (sub-stage CONST_P_MAP(IC, Dim) illustrated in FIG. 36).

One thus establishes a probability card P_MAP based on a set of accumulated Gauss functions G, in which the Gauss functions G are constructed from:
- indices of confidence IC, an index representing the maximum value of a Gauss function G;
- dimensions Dim of the regions of interest ROI representing the staggering of a Gauss function G. In one example without limitation, the dimension taken is the width. The dimensions taken are the height and the width.

Thus, if one represents a Gauss function G in mathematical terms, one has:

$$f(x) = ae^{-\frac{(x-b)^2}{2c^2}}$$

With e as the Euler number.

The Gauss function G is represented in graphic order as a bell-shaped symmetrical curve.

One thus has:
- a=the height of the bell, represented by an index of confidence IC;
- c=the width of the bell, represented by the size (in width) of a region of interest ROI; and
- b=the position of the summit of the curve.

The probability card P_MAP thus involves several Gauss functions G, some of which may or may not tally, as illustrated in one example without limitation in FIG. 38.

One will note that in the case where detection by shape recognition DET_FORM(ROI1, I) and movement detection (DET_MVT1 (Iref, Tres, Smax, H) are used, the probability card P_MAP is constructed from the first regions of interest ROI1 and the second regions of interest ROI2 found previously, as illustrated in FIG. 37.

b) Accumulate these distributions of probability which tally in the probability card (P_MAP) in order to obtain at least one local maximum (sub-stage ADD_G(P_MAP, ICF) illustrated in FIG. 36).

One thus obtains several local maximums resulting in several resulting indices of confidence ICF. A local maximum makes it possible to obtain the most likely localization of having an obstacle O which is a pedestrian.

As illustrated in the diagrammatic example of FIG. 38, one will obtain three local maximums of Gauss functions G.

One will note that in one mode of completion without limitation, a resulting index of confidence ICF has a ceiling of 1.

c) Validate the region of interest ROI1, ROI2 which is closer to each local maximum of the probability card P_MAP ((sub-stage VALID_CLASS (ROI, ICF) illustrated in FIG. 36).

In one variant of completion without limitation, for each local maximum, one chooses the region of interest ROI (of which the index of confidence was used for the local maximum) the summit of which is situated closer to this local maximum, and one attributes to its associated index of confidence IC, the resulting index of confidence ICF. This variant makes it possible to refer to a region of interest ROI already existing as determined beforehand in the previous stages, and makes it possible to remain accurate at the level of the localization of an obstacle O (a region of interest already existing being centered on an obstacle O).

Thus, in the explanatory example of the diagram of FIG. 39 (in 2D for the sake of simplicity), there are two Gauss functions g1, g2 and their local maximum gc. The Gauss function g2 is the one, the summit of which is closer to the local maximum. The associated region of interest ROI is thus validated.

In another variant of completion without limitation, one could uphold the index of confidence ICF resulting from the accumulation of the Gauss functions. At this moment, the choice of the region of interest ROI would be a region of interest ROI centered on this index of confidence.

One recalls that the regions of interest ROI are the regions ROI1, ROI2 determined during stage 3 and the indices of confidence IC are the indices of confidence IC1, IC2 determined during stage 4 (arising from the classification).

d) compare the local maximums of the Gauss functions which tally in relation to a threshold of detection SG (sub-stage COMP(G, SG) illustrated in FIG. 36).

If each local maximum (in height) is below this threshold, one estimates that the resulting index of confidence ICF is nil. One thus estimates that no pedestrian is detected, but that the Gauss functions correspond to noise or a false detection. In this case, one retains no region of interest ROI which served the purposes of the accumulation.

Thus, the validation classification makes it possible to select regions of interest ROI classified taken among the regions of interest ROI arising from the classification stage and which each represents a pedestrian.

At this moment, during the seventh stage 7), the regions of interest ROI which are planned in the reference marker COORef are the validated regions of interest.

Furthermore, during the ninth stage 9), one attributes a determined POS position to the classified obstacle O in accordance with the alignment and the validation. Thus, when an alignment is positive, one associates with the detected obstacle O the validated region of interest.

One will note that once the third mode of completion of the detection by image processing and the second movement detection are used, one obtains as illustrated in FIG. 40:
- detection by image processing including:
  - detection by shape recognition DET_FORM(ROI1, I);
  - movement detection according to the first mode of completion DET_MVT1 (Iref, IS, Smax, H);
- detection by sensors including:
  - detection by ultrasound sensors ULS DET_CAPT1 (POS, S1);
  - detection by radar sensors RAD DET_CAPT2(POS, S1).

Thus, the procedure described makes it possible to reliably detect obstacles O, whether or not they are pedestrians, based not only on detection by image processing, but also on detection by sensors and with a minimum of dead zone.

The procedure of the invention is commissioned by a DISP device of detection of an obstacle O within an environment E of a motor vehicle, this device being represented in diagram form in FIG. 41.

This DISP device is integrated in the motor vehicle V.

This DISP device is fit to:
- carry out a first obstacle detection O by image processing resulting in a definition of at least one region of interest ROI;

classify the detected obstacle O with an index of confidence applied to the region of interest ROI in relation to given characteristics C;

carry out a second obstacle detection O by sensor(s) with detection range below a first threshold S1 resulting in a determined POS position;

project the determined POS position into a reference marker COORef;

project the region of interest ROI into this reference marker COORef; and align the two projections obtained PJ1, PJ2 and attribute a determined POS position to the classified obstacle O in accordance with the alignment.

In modes of completion without limitations, the DISP device of detection is also fit to:

During the first detection by shape recognition:
constructing a pyramid of images Isr by recursive sub-sampling of an acquired image I;
for each sub-sampled image Isr:
scan this image Isr with a VIGN label representing a certain obstacle O;
at each successive position of a VIGN label in this image Isr, analyse its content by means of a set of classifiers Cls, Clw, these classifiers being determined during a phase of prior apprenticeship.

During the first detection by shape recognition, determine a scanning zone Zb in a sub-sampled image Isr.

During the first movement detection:
construct a background Image Iref recalculated for each image I of an image sequence SQ;
take out the background Image Iref to the current Image Ic in the sequence of image SQ, resulting in a resulting Image Tres;
discriminate certain movements in the resulting Image Tres according to an Smax threshold; and
extract second regions of interest ROI2 from the discrimination.

During the classification stage:
create a vector of characteristics C from the regions of interest ROI;
classify this vector of characteristics C by comparison with a border of decision DG determined previously during an apprenticeship stage; and
determine an associated index of confidence IC according to the distance of the vector of characteristics in relation to this border of decision.

During the validation stage:
construct a probability card P_MAP corresponding to an image I in which each classified region of interest ROI1, ROI2 is represented by a distribution of probability;
accumulate these distributions of probability which tally in the probability card P_MAP in order to obtain at least one local maximum; and
validate the region of interest ROI1, ROI2 which is closer to each local maximum of the probability card (P_MAP).

Apply a change of perspective to an acquired image I.

Follow classified regions of interest on a sequence SQ of acquired images I.

In one mode of completion without limitation, the DISP device involves a set of control units UC including at least one control unit fit to carry out the stages described above. In one variant of completion without limitation, the set involves several control units UC1, UC2, UC3. Thus, in variants of completion without limitation, the control units UC may be divided into the CAM camera, the projectors PJ, the sensors ULS, RAD, or even a calculator vehicle ECU.

In the example without limitation of FIG. 41, the functions of first detections by image processing are divided into the CAM camera and the functions of second detections by sensors in the CAPT sensors, the other functions being divided into the ECU calculator.

In one mode of completion without limitation, the CAM camera is of type VGA or WGA and makes it possible to acquire images of respective size of 640*480 pixels or 752*480 pixels. In one example without limitation, the angle of opening $\phi$ is 40°. Of course, other types of cameras with other characteristics may be used.

One will note that the above-mentioned detection procedure may be commissioned by means of a micro-programmed "software" device, a hard-wired logic and/or electronic "hardware" components.

Thus, the DISP adjustment device may involve one or more computer program products PG including one or more sequences of instructions executable from an information processing unit such as a microprocessor, or a processing unit of a microcontroller, ASIC, computer etc., the execution of these sequences of instructions allowing the described procedure to be commissioned.

Such a computer program PG may be recorded in ROM type non-volatile recordable memory or in EPPROM or FLASH type non-volatile re-recordable memory. This computer program PG may be recorded in memory in the factory or again loaded in memory or remotely loaded in memory. The sequences of instructions may be sequences of machine instructions, or again sequences of a command language interpreted by the processing unit at the time of their execution.

In the example without limitation of FIG. 41, there are several computer program products PG1, PG2, PG3 which are recorded in a memory of the control unit(s) UC1, UC2, UC3 of the DISP device.

Of course, the invention is not limited to the modes of completion and examples described above.

Thus, once the detection of a pedestrian has been validated, one can arrange an alert system which makes it possible to alert the driver of vehicle V that a pedestrian is situated close to the vehicle and enables him to brake, for example. One can also provide an automatic braking system following such a detection.

Thus, the detection procedure may be used for detection behind and/or in front of the motor vehicle V.

Thus, the invention particularly presents the following advantages:

it reduces the number of processing operations to be carried out thanks to:
the determination of regions of interest in particular detection zones (below a horizon line or even in a scanning zone);
the establishment of the displacement of an obstacle in relation to the vehicle by means of specific points of interest;
the application of the classification stage (by a method of spreading by categories) only on obstacles detected by shape and movement recognition and not on a whole image;
it makes pedestrian detection more reliable thanks to the following combination:
detection by shape recognition which makes it possible to recognize a pedestrian as a whole;

a movement detection which makes it possible to recognize an obstacle which is mobile, particularly pedestrians of whom one only sees one part of the moving body;

detection by sensors.

it uses components currently present on a motor vehicle, such as a camera and ultrasound or radar detectors;

it strengthens pedestrian detection by using a method of spreading obstacles by categories in order to classify all the obstacles detected by shape recognition and movement recognition;

it increases the index of confidence concerning pedestrian detection thanks to the validation stage and thus reduces the number of detections to be subsequently processed if applicable; and it confirms the detection of an obstacle on a sequence of images once this detection is no longer detected from one image to the other by the first and second detections.

While the procedure herein described, and the forms of apparatus for carrying this procedure into effect, constitute preferred embodiments of this invention, it is to be understood that the invention is not limited to this precise procedure and forms of apparatus, and that changes may be made in either without departing from the scope of the invention, which is defined in the appended claims.

What is claimed is:

1. An obstacle detection procedure (O) within an environment (E) of a motor vehicle, featuring the fact that it involves the following stages:

carrying out a first obstacle detection (O) by image processing resulting in a definition of at least one region of interest (ROI);

classifying the detected obstacle (O) with an index of confidence (IC) applied to the region of interest (ROI) in relation to a given characteristics (C);

carrying out a second obstacle detection (O) by sensor(s) (ULS; RAD) with detection range below a first threshold (S1) resulting in a determined position (POS);

projecting the determined position (POS) in a reference marker (COORef);

projecting the region of interest (ROI) in this reference marker (COORef); and aligning the two projections obtained (PJ1, PJ2) and attributing a determined position (POS) to the classified obstacle (O) in accordance with the alignment.

2. The obstacle detection procedure according to claim 1, wherein the reference marker is the image marker (XI, YI).

3. The obstacle detection procedure according to claim 1, wherein the first detection by image processing involves detection by shape recognition in an acquired image of this environment.

4. The obstacle detection procedure according to claim 3, wherein detection by shape recognition involves the following sub-stages:

constructing a pyramid of images (Isr) by recursive sub-sampling of an acquired image (I);

for each sub-sampled image (Isr):

scanning this image (Isr) with a label (VIGN) representing a certain obstacle (O);

at each successive position of a label (VIGN) in this image (Isr), analysing its content by means of a set of classifiers (Cls, Clw), these classifiers being determined during a phase of prior apprenticeship.

5. The obstacle detection procedure according to claim 4, wherein detection by shape recognition also involves a further sub-stage to determine a scanning zone (Zb) in a sub-sampled image (Isr).

6. The obstacle detection procedure according to claim 1, wherein the first detection by image processing involves movement detection in relation to the vehicle (V) on a sequence (SQ) of acquired images (I) of this environment (E).

7. The obstacle detection procedure according to claim 6, wherein the movement detection involves the following sub-stages:

constructing a background image (Iref) recalculated for each image (I) of a sequence of images (SQ);

taking out the background image (Iref) to the current image (Ic) in the sequence of images (SQ) resulting in a resulting image (Tres);

discriminating certain movements in the resulting image (Tres) according to a threshold (Smax); and extracting second regions of interest (ROI2) from the discrimination.

8. The obstacle detection procedure according to claim 1, wherein the classification stage involves the following sub-stages:

creating a vector of characteristics (C) from the regions of interest (ROI);

classifying this vector of characteristics (C) by comparison with a border of decision (DG) determined previously during an apprenticeship stage; and determining an associated index of confidence (IC) according to the distance of the vector of characteristics in relation to this border of decision (DG).

9. The obstacle detection procedure according to claim 8, wherein the vector of characteristics (C) is a histogram of the orientated gradients of a region of interest (ROI1, ROI2).

10. The obstacle detection procedure according to claim 1, wherein it also involves a further stage of validating the classification of the object detected in relation to regions of interest and in relation to indices of confidence determined during the first detection and/or during the classification.

11. The obstacle detection procedure according to claim 10, wherein the validation stage involves the following sub-stages:

constructing a probability card (P_MAP) corresponding to an image (I) in which each classified region of interest (ROI1, ROI2) is represented by a distribution of probability;

accumulating these distributions of probability which tally in the probability card (P_MAP) in order to obtain at least one local maximum; and validating the region of interest (ROI1, ROI2) which is closer to each local maximum of the probability card (P_MAP).

12. The obstacle detection procedure according to claim 1, wherein detection by sensor(s) is carried out by means of ultrasound sensors (ULS).

13. The obstacle detection procedure according to claim 1, wherein detection by sensor(s) is carried out by means of radar sensors (RAD).

14. The obstacle detection procedure according to claim 1, wherein it also involves a further stage of applying a change of perspective to an acquired image (I).

15. The obstacle detection procedure according to claim 1, wherein it also involves a further stage of follow-up of the regions of interest classified on a sequence (SQ) of acquired images.

16. A detection device of an obstacle (O) within an environment (E) of a motor vehicle, arranged to commission a procedure according to claim 1.

17. A non-transitory computer readable medium comprising a computer program product (PG) including one or more sequences of instructions executable from an information processing unit, the execution of these sequences of instructions allowing the procedure to be commissioned according to claim 1.

18. An obstacle detection system (O) within an environment (E) of a motor vehicle comprising:
- an image system for carrying out a first obstacle detection (O) by image processing resulting in a definition of at least one region of interest (ROI) so that the detected obstacle (O) can be classified with an index of confidence (IC) applied to the region of interest (ROI) in relation to a given characteristics (C); and
- for sensing a second obstacle detection (O) by at least one sensor (ULS; RAD) with detection range below a first threshold (S1) resulting in a determined position (POS);
- means for projecting the determined position (POS) in a reference marker (COORef);
- means for projecting the region of interest (ROI) in this reference marker (COORef); and
- means for aligning the two projections obtained (PJ1, PJ2) and attributing a determined position (POS) to the classified obstacle (O) in accordance with the alignment.

19. The obstacle detection system according to claim 18, wherein the reference marker is the image marker (XI, YI).

20. The obstacle detection system according to claim 18, wherein the first detection by image processing involves detection by shape recognition in an acquired image of this environment.

21. The obstacle detection system according to claim 18, wherein the first detection by said image system involves movement detection in relation to the vehicle (V) on a sequence (SQ) of acquired images (I) of this environment (E).

22. The obstacle detection system according to claim 18, wherein said image system creates a vector of characteristics (C) from the regions of interest (ROI), classifies this vector of characteristics (C) by comparison with a border of decision (DG) determined previously during an apprenticeship stage and determines an associated index of confidence (IC) according to the distance of the vector of characteristics in relation to this border of decision (DG).

23. The obstacle detection system according to claim 18, wherein it also involves a further stage of validating the classification of the object detected in relation to regions of interest and in relation to indices of confidence determined during the first detection and/or during the classification.

24. The obstacle detection system according to claim 18, wherein detection by said at least one sensor is carried out by ultrasound sensors (ULS).

25. The obstacle detection system according to claim 18, wherein detection said at least one sensor is carried out by radar sensors (RAD).

26. The obstacle detection system according to claim 18, wherein it also involves a further stage of applying a change of perspective to an acquired image (I).

27. The obstacle detection procedure according to claim 18, wherein it also involves a further stage of follow-up of the regions of interest classified on a sequence (SQ) of acquired images.

28. An obstacle detection system (O) within an environment (E) of a motor vehicle comprising:
- an image system for carrying out a first obstacle detection (O) by image processing resulting in a definition of at least one region of interest (ROI) so that the detected obstacle (O) can be classified with an index of confidence (IC) applied to the region of interest (ROI) in relation to a given characteristics (C); and
- for sensing a second obstacle detection (O) by at least one sensor (ULS; RAD) with detection range below a first threshold (S1) resulting in a determined position (POS);
- a processor adapted to:
    - project the determined position (POS) in a reference marker (COORef);
    - project the region of interest (ROI) in this reference marker (COORef); and
    - align the two projections obtained (PJ1, PJ2) and attributes a determined position (POS) to the classified obstacle (O) in accordance with the alignment.

29. The obstacle detection system according to claim 28, wherein the reference marker is the image marker (XI, YI).

30. The obstacle detection system according to claim 28, wherein the first detection by image processing involves detection by shape recognition in an acquired image of this environment.

31. The obstacle detection system according to claim 28, wherein the first detection by said image system involves movement detection in relation to the vehicle (V) on a sequence (SQ) of acquired images (I) of this environment (E).

32. The obstacle detection system according to claim 28, wherein said image system creates a vector of characteristics (C) from the regions of interest (ROI), classifies this vector of characteristics (C) by comparison with a border of decision (DG) determined previously during an apprenticeship stage and determines an associated index of confidence (IC) according to the distance of the vector of characteristics in relation to this border of decision (DG).

33. The obstacle detection system according to claim 28, wherein it also involves a further stage of validating the classification of the object detected in relation to regions of interest and in relation to indices of confidence determined during the first detection and/or during the classification.

34. The obstacle detection system according to claim 28, wherein detection by said at least one sensor is carried out by ultrasound sensors (ULS).

35. The obstacle detection system according to claim 28, wherein detection by said at least one sensor is carried out by radar sensors (RAD).

36. The obstacle detection system according to claim 28, wherein it also involves a further stage of applying a change of perspective to an acquired image (I).

37. The obstacle detection procedure according to claim 28, wherein it also involves a further stage of follow-up of the regions of interest classified on a sequence (SQ) of acquired images.

* * * * *